US012707328B2

(12) United States Patent
Yao et al.

(10) Patent No.: US 12,707,328 B2
(45) Date of Patent: Aug. 11, 2026

(54) DATA COMPRESSION METHOD IN BeiDou COMMUNICATION SYSTEM, SYSTEM, AND RELATED APPARATUS

(71) Applicant: Huawei Technologies Co., Ltd., Shenzhen (CN)

(72) Inventors: Zhendong Yao, Shanghai (CN); Feng Qian, Shanghai (CN); Zhenzhou Li, Shanghai (CN); Ying Zhu, Shenzhen (CN); Lixin Lin, Shanghai (CN); Chuting Yao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 18/681,327

(22) PCT Filed: Aug. 2, 2022

(86) PCT No.: PCT/CN2022/109726
§ 371 (c)(1),
(2) Date: Feb. 5, 2024

(87) PCT Pub. No.: WO2023/011478
PCT Pub. Date: Feb. 9, 2023

(65) Prior Publication Data

US 2024/0340697 A1 Oct. 10, 2024

(30) Foreign Application Priority Data

Aug. 6, 2021 (CN) ......................... 202110903759.0
Sep. 13, 2021 (CN) ......................... 202111069259.8

(51) Int. Cl.
*H04W 28/06* (2009.01)
*H04B 7/185* (2006.01)

(52) U.S. Cl.
CPC ........ *H04W 28/06* (2013.01); *H04B 7/18513* (2013.01)

(58) Field of Classification Search
CPC ....... H04W 28/06; H04W 8/183; H04W 8/06; H04W 8/26; H04W 4/14; H04B 7/18513; H03M 7/30; H04L 69/04
See application file for complete search history.

(56) References Cited

U.S. PATENT DOCUMENTS 6,522,635 B1 * 2/2003 Bedwell ............. H04B 7/18528 370/321
10,645,561 B1 * 5/2020 Guo ........................ H04W 4/42
(Continued)

FOREIGN PATENT DOCUMENTS

CA 3041493 A1 * 10/2019 ............. H04L 69/26
CN 102882879 A * 1/2013
(Continued)

OTHER PUBLICATIONS

CN 106453160 A—PE2E Machine translation (Year: 2017).*

*Primary Examiner* — Sujoy K Kundu
*Assistant Examiner* — Vladislav Y Agureyev
(74) *Attorney, Agent, or Firm* — Slater Matsil, LLP

(57) ABSTRACT

In accordance with an embodiment, a method includes: encoding, by a first terminal at a satellite link control (SLC) layer, a first user identification (ID) of the first terminal into binary first data, wherein the first user ID comprises second data and third data, the binary first data includes binary fourth data and binary fifth data, the binary fourth data is obtained by encoding sixth data, the sixth data is obtained by compressing the second data, a data length of the sixth data is less than that of the second data, and the binary fifth data is obtained by encoding the third data; filling, by the first terminal at the SLC layer, the binary first data in a user ID
(Continued)

field in frame header information of a first user frame; and sending, by the first terminal, the first user frame to a satellite network device.

20 Claims, 16 Drawing Sheets

(56) References Cited

U.S. PATENT DOCUMENTS

| | | | | |
|---|---|---|---|---|
| 10,778,325 | B2 * | 9/2020 | Haley | H04B 7/18513 |
| 10,848,253 | B1 * | 11/2020 | Liberko | H04B 17/318 |
| 11,843,971 | B2 * | 12/2023 | Srivastava | H04W 76/10 |
| 2009/0232161 | A1 * | 9/2009 | Yeo | H04L 1/1825 370/473 |
| 2014/0093013 | A1 * | 4/2014 | Ouchi | H04W 52/42 375/295 |
| 2015/0312838 | A1 * | 10/2015 | Torres | H04L 65/1069 370/329 |
| 2016/0209720 | A1 * | 7/2016 | Kompanets | G02F 1/141 |
| 2016/0219458 | A1 * | 7/2016 | Kubota | H04W 28/06 |
| 2017/0331577 | A1 * | 11/2017 | Parkvall | H04B 7/0452 |
| 2017/0331670 | A1 * | 11/2017 | Parkvall | H04W 52/0229 |
| 2017/0373916 | A1 * | 12/2017 | Oh | H04L 65/611 |
| 2018/0037336 | A1 * | 2/2018 | Rammos | B64D 47/06 |
| 2018/0146398 | A1 * | 5/2018 | Kim | H04W 28/065 |
| 2018/0159612 | A1 * | 6/2018 | Ouchi | H04B 7/10 |
| 2018/0210090 | A1 * | 7/2018 | Soualle | G01S 19/396 |
| 2018/0248609 | A1 * | 8/2018 | Ouchi | H04L 1/0055 |
| 2018/0359811 | A1 * | 12/2018 | Verzun | H04L 12/28 |
| 2019/0103030 | A1 * | 4/2019 | Banga | G01S 5/0027 |
| 2020/0242950 | A1 * | 7/2020 | Guo | G08G 5/22 |
| 2021/0006376 | A1 * | 1/2021 | Cirik | H04L 1/1861 |
| 2021/0007149 | A1 * | 1/2021 | Li | H04L 5/0048 |
| 2021/0058293 | A1 * | 2/2021 | Whitefield | H04B 7/18539 |
| 2021/0058970 | A1 * | 2/2021 | Kwak | H04W 72/23 |
| 2022/0015102 | A1 * | 1/2022 | Gallagher | H04W 36/0055 |
| 2022/0174735 | A1 * | 6/2022 | Li | H04W 74/0816 |
| 2022/0183053 | A1 * | 6/2022 | Li | H04W 74/006 |
| 2022/0317290 | A1 * | 10/2022 | Kostanic | G01S 19/073 |
| 2024/0193945 | A1 * | 6/2024 | Wang | H04N 23/68 |

FOREIGN PATENT DOCUMENTS

| | | | | |
|---|---|---|---|---|
| CN | 106453160 A | * | 2/2017 | H04L 63/0428 |
| CN | 108306715 A | * | 7/2018 | H04L 67/565 |
| CN | 108337036 A | * | 7/2018 | H04W 40/02 |
| CN | 108398700 A | * | 8/2018 | G01S 19/41 |
| CN | 111817774 A | * | 10/2020 | H04B 7/18521 |
| CN | 112565219 A | * | 3/2021 | H04L 63/083 |
| CN | 110324076 B | * | 1/2022 | H04W 56/0035 |
| JP | 7260460 B2 | * | 4/2023 | B64C 13/20 |
| WO | WO-2022020694 A1 | * | 1/2022 | H04W 72/23 |

* cited by examiner

TO FIG. 3B
TO FIG. 3B
TO FIG. 3B

SLC PDU: satellite link control layer protocol data unit

AM enable: acknowledgement mode enable

SAI: service data unit alternated indicator

RSV: reserved

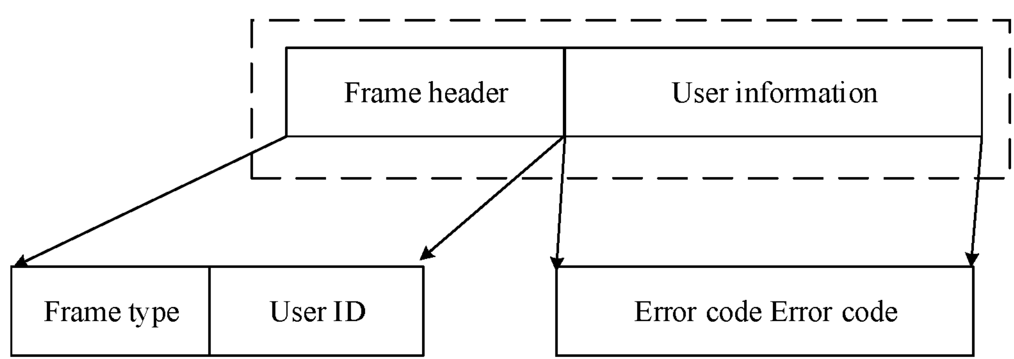

FIG. 10

S101: A terminal 100 encodes a mobile number of the terminal 100 into binary data D1, where the mobile number includes an NDC 1 and an SN 1, the data D1 includes data D2 and data D3, the data D2 is obtained by encoding data D4, the data D4 is obtained by compressing the NDC 1, a data length of the data D4 is less than that of the NDC 1, and the data D3 is obtained by encoding the SN 1

↓

S102: The terminal 100 fills the data D1 in a user ID field included in frame header information of a first user frame

FIG. 11A

S201: A BeiDou network device 200 obtains a user ID of a terminal 100

↓

S202: The BeiDou network device 200 compresses the user ID of the terminal 100 into data D6, and encodes the data D6 into binary data D7, where a data length of the data D6 is less than that of the user ID

↓

S203: The BeiDou network device 200 fills the data D7 in a user ID field included in frame header information of a second user frame

FIG. 11B

DATA COMPRESSION METHOD IN BeiDou COMMUNICATION SYSTEM, SYSTEM, AND RELATED APPARATUS

CROSS-REFERENCE TO RELATED APPLICATIONS

This application is a National Stage of International Application No. PCT/CN2022/109726, filed on Aug. 2, 2022, which claims priority to Chinese Patent Application No. 202110903759.0, filed on Aug. 6, 2021, and Chinese Patent Application No. 202111069259.8, filed on Sep. 13, 2021, all of which are hereby incorporated by reference in their entireties.

TECHNICAL FIELD

This application relates to the field of BeiDou communication technologies and the field of compression technologies, and in particular, to a data compression method in a BeiDou communication system, a system, and a related apparatus.

BACKGROUND

The BeiDou navigation satellite system is an important infrastructure autonomously developed and manufactured by China, which integrates positioning, time serving, and communication. A BeiDou short message system sends short message information by using the BeiDou navigation satellite system. The BeiDou short message system is quite applicable to a region which is not covered or cannot be covered with mobile communication or in which a communication system is damaged, for example, an ocean, a desert, a grassland, or a depopulated land.

In a short message system of BeiDou-3 satellites, a short message technology system is upgraded. Some necessary resources of the BeiDou short message system are opened for civil use. For a civil service and a device feature, a communication protocol needs to be designed based on a feature of the BeiDou short message system.

Currently, in a BeiDou short message communication system, a user number is allocated to each user to identify an identity of the user. The user number is also referred to as a user ID. Due to limitation of receiving and sending capabilities in satellite communication of mass terminals, frame header overheads generated during uplink and downlink sending should be minimized. A BCD (Binary-Coded Decimal) code is used for a conventional mobile number encoding manner. If this encoding manner is used, there are more frame header overheads.

Therefore, how to encode the user ID in the BeiDou system to minimize the frame header overheads becomes an urgent issue that needs to be resolved by a person skilled in the art.

SUMMARY

This application provides a data compression method in a BeiDou communication system, a system, and a related apparatus. According to the method provided in embodiments of this application, frame header overheads can be reduced during data transmission.

According to a first aspect, a data compression method in a BeiDou communication system is provided. The method may include: A first terminal encodes, at a satellite link control SLC layer, a first user ID of the first terminal into binary first data, where the first user ID includes second data and third data, the first data includes binary fourth data and binary fifth data, the fourth data is obtained by encoding sixth data, the sixth data is obtained by compressing the second data, a data length of the sixth data is less than that of the second data, and the fifth data is obtained by encoding the third data; the first terminal fills, at the SLC layer, the first data in a user ID field in frame header information of a first user frame; and the terminal sends the first user frame to a BeiDou network device.

The first user ID may be a mobile number of the first terminal. The second data may be a national destination code NDC in the mobile number. The third data may be a subscriber number SN in the mobile number.

In this way, a bit occupied by a user ID in frame header information of a user frame can be reduced. When the terminal sends the user frame to the BeiDou network device, frame header overheads can be reduced.

With reference to the first aspect, in a possible implementation, that a first terminal encodes, at a satellite link control SLC layer, a first user ID of the first terminal into binary first data includes: The first terminal compresses, at the SLC layer, the second data in the first user ID of the first terminal into the sixth data, where the first user ID includes the second data and the third data, and the data length of the sixth data is less than that of the second data; the first terminal encodes, at the SLC layer, the sixth data into the fourth data, and encodes the third data into the fifth data; and the first terminal combines the fourth data and the fifth data into the first data.

In this way, the bit occupied by the user ID in the frame header information of the user frame can be reduced.

With reference to the first aspect, in a possible implementation, that the first terminal compresses, at the SLC layer, the second data in the first user ID of the first terminal into the sixth data includes: The first terminal maps, at the SCL layer, the second data in the first user ID to the sixth data in a mapping table, where the mapping table includes the second data of a plurality of values and the sixth data of a plurality of values, the second data of the plurality of values includes second data of a first value, the sixth data of the plurality of values includes sixth data of a second value, and the second data of the first data is mapped to the sixth data of the second value.

In this way, a piece of second data can be compressed into a piece of sixth data with a shorter data length. In addition, the second data is in a one-to-one correspondence with the sixth data. This avoids a case in which a piece of data obtained after compression does not correspond to a piece of data obtained before compression. In this way, no error occurs during decoding.

With reference to the first aspect, in a possible implementation, that the first terminal compresses, at the SLC layer, the second data in the first user ID of the first terminal into the sixth data includes: The first terminal subtracts, at the SCL layer, a preset offset value from the second data in the first user ID, to obtain the sixth data.

In this way, a piece of second data can be compressed into a piece of sixth data with a shorter data length.

With reference to the first aspect, in a possible implementation, that the first terminal encodes, at the SLC layer, the sixth data into the fourth data, and encodes the third data into the fifth data includes: The first terminal converts, at the SLC layer, the sixth data as a decimal integer into the binary fourth data, and converts the third data as a decimal integer into the binary fifth data.

A data length of binary data obtained by encoding one piece of data as a whole is shorter than a data length of binary data obtained by encoding the piece of data in an 8421 encoding manner. Therefore, the sixth data and the third data can be encoded into binary data with shorter data.

With reference to the first aspect, in a possible implementation, before that a first terminal encodes, at a satellite link control SLC layer, a first user ID of the first terminal into binary first data, the method may further include: The first terminal detects a first operation, where the first operation indicates the first terminal to send a first message to a second terminal; the first terminal compresses, at an application APP layer, a second user ID of the second terminal, and then encodes a compressed second user ID into seventh data; and the first terminal generates, at the APP layer, a first message packet, where the first message packet includes a packet header and packet data, the packet header includes the seventh data, and the packet data includes content of the first message.

In this way, a bit occupied by a user ID in a packet header in a packet can be reduced.

With reference to the first aspect, in a possible implementation, after that the first terminal generates, at the APP layer, a first message packet, the method may further include: The first terminal delivers the first message packet to the SLC layer, to obtain one or more satellite link control layer service data units SLC SDUs, where the one or more SLC SDUs include a first SLC SDU; and the first terminal segments the first SLC SDU into one or more user frames, where the one or more user frames include the first user frame.

With reference to the first aspect, in a possible implementation, the method may further include: The first terminal receives a second user frame sent by the BeiDou network device, where the second user frame is sent by the second terminal to the first terminal; and the first terminal decodes and decompresses, at the SLC layer, a user ID field in frame header information of the second user frame, to obtain the first user ID of the first terminal.

In this way, the terminal can obtain, through decompression, a user ID of the terminal from a user ID field in the frame header information of the user frame.

With reference to the first aspect, in a possible implementation, the method may further include: The first terminal receives a second user frame sent by the BeiDou network device, where the second user frame is sent by the second terminal to the first terminal; the first terminal decodes and decompresses, at the SLC layer, a user ID field in frame header information of the second user frame, to obtain user ID data; and when the first terminal determines that the user ID data is the same as the first user ID, the first terminal uploads the second user frame to a message data convergence MDCP layer; or when the first terminal determines that the user ID data is different from the first user ID, the first terminal discards the second user frame.

With reference to the first aspect, in a possible implementation, after that the first terminal decodes and decompresses, at the SLC layer, a user ID field in frame header information of the second user frame, to obtain the first user ID of the first terminal, the method may further include: The first terminal uploads user data in the second user frame to the application layer, to obtain a second message packet; the first terminal decodes and decompresses, at the APP layer, a user ID field in a header of the second message packet, to obtain the second user ID of the second terminal; and the first terminal determines based on the second user ID, that the second message packet is sent by the second terminal.

According to a second aspect, a data compression method in a BeiDou communication system is provided. The method may include: A BeiDou network device encodes, at a satellite link control SLC layer, a first user ID of a first terminal into binary first data, where the first user ID includes second data and third data, the first data includes binary fourth data and binary fifth data, the fourth data is obtained by encoding sixth data, the sixth data is obtained by compressing the second data, a data length of the sixth data is less than that of the second data, and the fifth data is obtained by encoding the third data; the BeiDou network device fills, at the SLC layer, the first data in a user ID field in frame header information of a second user frame; and the BeiDou network device sends the second user frame to the first terminal.

The first user ID may be a mobile number of the first terminal. The second data may be a national destination code NDC in the mobile number. The third data may be a subscriber number SN in the mobile number.

In this way, a bit occupied by a user ID in frame header information of a user frame can be reduced. When the BeiDou network device sends the user frame to a terminal, frame header overheads can be reduced.

With reference to the second aspect, in a possible implementation, before that a BeiDou network device encodes, at a satellite link control SLC layer, a first user ID of a first terminal into binary first data, the method may further include: The BeiDou network device obtains the first user ID of the first terminal.

With reference to the second aspect, in a possible implementation, that the BeiDou network device obtains the first user ID of the first terminal includes: The BeiDou network device receives a first user frame sent by the first terminal, where a user ID field in frame header information of the first user frame indicates the first user ID of the first terminal; and the BeiDou network device obtains, through decoding, the first user ID from the first user frame.

With reference to the second aspect, in a possible implementation, that the BeiDou network device obtains the first user ID of the first terminal includes: The BeiDou network device receives a first user frame sent by the first terminal, where a user ID field in frame header information of the first user frame indicates the first data; and the BeiDou network device decompresses and decodes the first data, to obtain the first user ID.

With reference to the second aspect, in a possible implementation, that the BeiDou network device obtains the first user ID of the first terminal includes: The BeiDou network device receives a second message packet, where the second message packet is sent by a second terminal to the first terminal by using the BeiDou network device, and the second message packet includes a user ID field indicating the first user ID of the first terminal; and the BeiDou network device obtains, through decoding, the first user ID from a user ID field in a packet header of the second message packet.

With reference to the second aspect, in a possible implementation, that a BeiDou network device encodes, at a satellite link control SLC layer, a first user ID of a first terminal into binary first data includes: The BeiDou network device compresses, at the SLC layer, the second data in the first user ID of the first terminal into the sixth data, where the first user ID includes the second data and the third data, and the data length of the sixth data is less than that of the second data; the BeiDou network device encodes, at the SLC layer, the sixth data into the fourth data, and encodes the third data into the fifth data; and the BeiDou network device combines the fourth data and the fifth data into the first data.

In this way, the bit occupied by the user ID in the frame header information of the user frame can be reduced.

With reference to the second aspect, in a possible implementation, that the BeiDou network device compresses, at the SLC layer, the second data in the first user ID of the first terminal into the sixth data includes: The BeiDou network device maps, at an SCL layer, the second data in the first user ID to the sixth data in a mapping table, where the mapping table includes the second data of a plurality of values and the sixth data of a plurality of values, the second data of the plurality of values includes second data of a first value, the sixth data of the plurality of values includes sixth data of a second value, and the second data of the first data is mapped to the sixth data of the second value.

In this way, a piece of second data can be compressed into a piece of sixth data with a shorter data length. In addition, the second data is in a one-to-one correspondence with the sixth data. This avoids a case in which a piece of data obtained after compression does not correspond to a piece of data obtained before compression. In this way, no error occurs during decoding.

With reference to the second aspect, in a possible implementation, that the BeiDou network device compresses, at the SLC layer, the second data in the first user ID of the first terminal into the sixth data includes: The BeiDou network device subtracts, at the SCL layer, a preset offset value from the second data in the first user ID, to obtain the sixth data.

In this way, a piece of second data can be compressed into a piece of sixth data with a shorter data length.

With reference to the second aspect, in a possible implementation, that the BeiDou network device encodes, at the SLC layer, the sixth data into the fourth data, and encodes the third data into the fifth data includes: The first terminal converts, at the SLC layer, the sixth data as a decimal integer into the binary fourth data, and converts the third data as a decimal integer into the binary fifth data.

A data length of binary data obtained by encoding one piece of data as a whole is shorter than a data length of binary data obtained by encoding the piece of data in an 8421 encoding manner. Therefore, the sixth data and the third data can be encoded into binary data with shorter data.

According to a third aspect, a BeiDou communication system is provided. The system may include a first terminal and a BeiDou network device.

The first terminal is configured to encode, at a satellite link control SLC layer, a first user ID of the first terminal into binary first data, where the first user ID includes second data and third data, the first data includes binary fourth data and binary fifth data, the fourth data is obtained by encoding sixth data, the sixth data is obtained by compressing the second data, a data length of the sixth data is less than that of the second data, and the fifth data is obtained by encoding the third data.

The first terminal is configured to fill, at the SLC layer, the first data in a user ID field in frame header information of a first user frame.

The first terminal is configured to send the first user frame to the BeiDou network device.

The BeiDou network device is configured to: receive the first user frame, and obtain, through decoding, the first user ID from the user ID field in the frame header information of the first user frame.

With reference to the third aspect, in a possible implementation, the network device is configured to:

encode, at the satellite link control SLC layer, the first user ID of the first terminal into the binary first data, where the first user ID includes the second data and the third data, the first data includes the binary fourth data and the binary fifth data, the fourth data is obtained by encoding the sixth data, the sixth data is obtained by compressing the second data, the data length of the sixth data is less than that of the second data, and the fifth data is obtained by encoding the third data; and fill, at the SLC layer, the first data in a user ID field in frame header information of a second user frame.

With reference to the third aspect, in a possible implementation, the BeiDou network device may further perform the method according to any one of the possible implementations of the second aspect.

With reference to the third aspect, in a possible implementation, the terminal may further perform the method according to any one of the possible implementations of the first aspect.

According to a fourth aspect, this application provides a communication apparatus, including one or more processors, one or more memories, and a transceiver. The transceiver and the one or more memories are coupled to the one or more processors. The one or more memories are configured to store computer program code. The computer program code includes computer instructions. When the one or more processors execute the computer instructions, the communication apparatus is enabled to perform the method according to any one of the possible implementations of the first aspect.

The communication apparatus may be a terminal or a device in another product form.

According to a fifth aspect, this application provides a communication apparatus, including one or more processors, one or more memories, and a transceiver. The transceiver and the one or more memories are coupled to the one or more processors. The one or more memories are configured to store computer program code. The computer program code includes computer instructions. When the one or more processors execute the computer instructions, the communication apparatus is enabled to perform the method according to any one of the possible implementations of the second aspect.

The communication apparatus may be a BeiDou network device, or any network element or a combination of a plurality of network elements in the BeiDou network device.

According to a sixth aspect, this application provides a computer storage medium, including computer instructions. When the computer instructions are run on a computer, the computer is enabled to perform the method according to any one of the possible implementations of the first aspect.

According to a seventh aspect, this application provides a computer storage medium, including computer instructions. When the computer instructions are run on a computer, the computer is enabled to perform the method according to any one of the possible implementations of the second aspect.

According to an eighth aspect, this application provides a computer program product. When the computer program product runs on a computer, the computer is enabled to perform the method according to any one of the possible implementations of the first aspect.

According to a ninth aspect, this application provides a computer program product. When the computer program product runs on a computer, the computer is enabled to perform the method according to any one of the possible implementations of the second aspect.

According to a tenth aspect, this application provides a chip or a chip system, used in a terminal, and including a processing circuit and an interface circuit. The interface circuit is configured to: receive code instructions, and transmit the code instructions to the processing circuit. The processing circuit is configured to run the code instructions to perform the method according to any one of the possible implementations of the first aspect.

BRIEF DESCRIPTION OF THE DRAWINGS

FIG. 10 is a schematic diagram of a frame format of an application layer receipt frame according to an embodiment of this application;

FIG. 11A is a schematic flowchart of a data compression method in a BeiDou communication system according to an embodiment of this application;

FIG. 11B is a schematic flowchart of a data compression method in a BeiDou communication system according to an embodiment of this application;

DETAILED DESCRIPTION OF THE EMBODIMENTS

Terms used in the following embodiments of this application are merely intended to describe specific embodiments, but are not intended to limit this application. The terms "one", "a", "the", "the foregoing", "this", and "the one" of singular forms used in the specification and the appended claims of this application are also intended to include plural forms, unless otherwise specified in the context clearly. It should be further understood that the term "and/or" used in this application indicates and includes any or all possible combinations of one or more associated listed items.

In the following descriptions, the terms "first" and "second" are merely intended for a purpose of description, and shall not be interpreted as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes a BeiDou communication system 10 provided in embodiments of this application.

Figure 1:
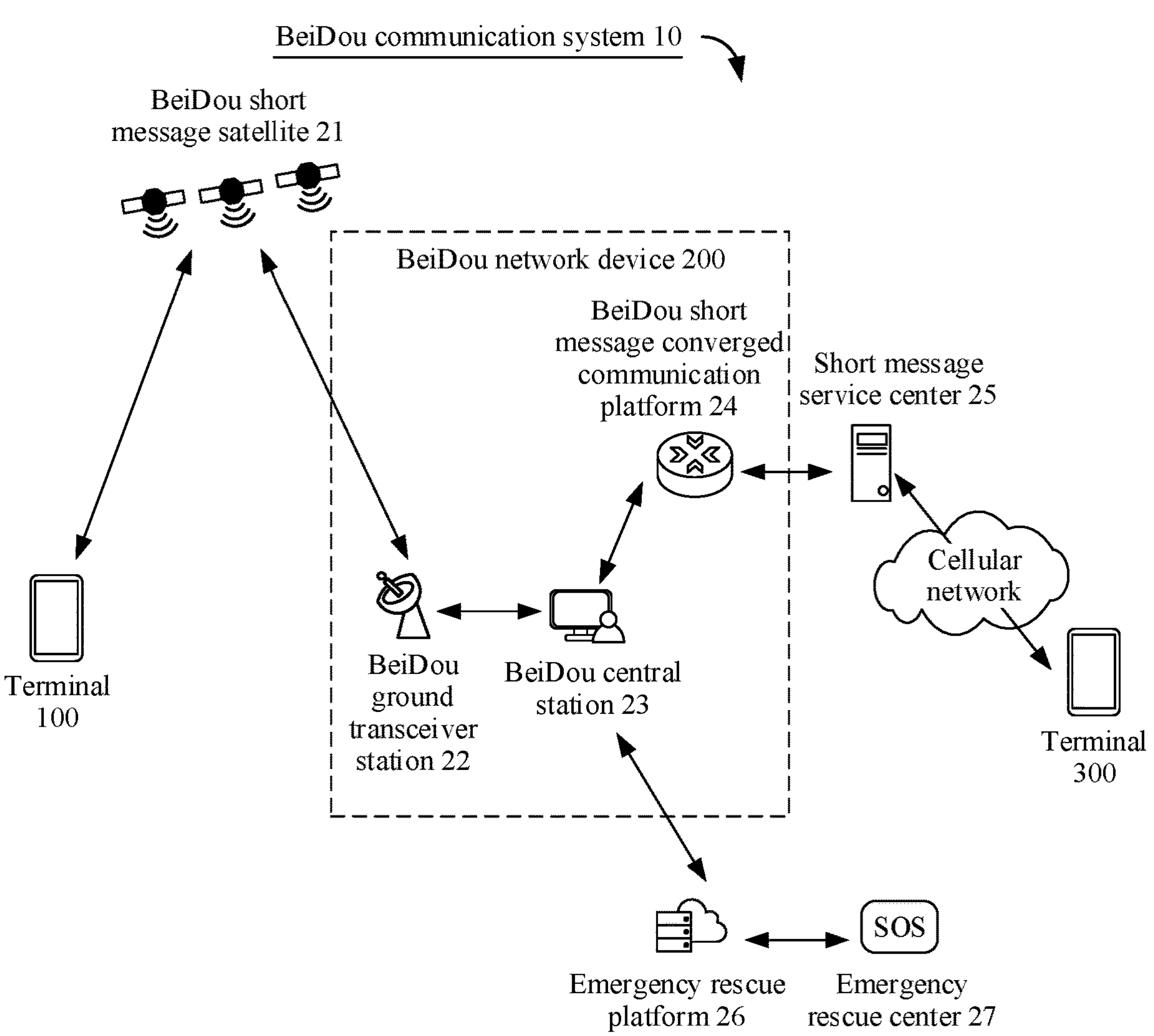
FIG. 1 is a schematic diagram of an architecture of a BeiDou communication system 10 according to an embodiment of this application.

FIG. 1 is a schematic diagram of an architecture of the BeiDou communication system 10 according to an embodiment of this application.

As shown in FIG. 1, the BeiDou communication system 10 may include a terminal 100, a BeiDou short message satellite 21, a BeiDou network device 200, a short message service center 25, and a terminal 300. Optionally, the BeiDou communication system 10 may further include an emergency rescue platform 26 and an emergency rescue center 27.

The terminal 100 may send short message information to the BeiDou short message satellite 21. The BeiDou short message satellite 21 performs only relay, and directly forwards, to the BeiDou network device 200 on the ground, the short message information sent by the terminal 100. The BeiDou network device 200 may parse, according to a BeiDou communication protocol, the short message information forwarded by the satellite, and forward, to the short message service center (short message service center, SMSC) 25, packet content of a general packet type and that is parsed out from the short message information. The short message service center 25 may forward the packet content to the terminal 300 through a conventional cellular communication network. The BeiDou network device 200 may also send, to the emergency rescue center 27 by using the emergency rescue platform 26, a message that is of an emergency rescue type and that is sent by the terminal 100.

The terminal 300 may also send a short message to the short message service center 25 through the conventional cellular communication network. The short message service center 25 may forward the short message of the terminal 300 to the BeiDou network device 200. The BeiDou network device 200 may send the short message of the terminal 300 to the terminal 100 through relay performed by the BeiDou short message satellite 21.

The BeiDou network device 200 may include a BeiDou ground transceiver station 22, a BeiDou central station 23, and a BeiDou short message converged communication platform 24. The BeiDou ground transceiver station 22 may include one or more devices having a sending function and one or more devices having a receiving function, or may include one or more devices having a sending function and a receiving function. This is not limited herein. The BeiDou ground transceiver station 22 may be configured for a function that is of processing data at a physical (physical layer protocol, PHY) layer and that is of the BeiDou network device 200. The BeiDou central station 23 may be configured for a function that is of processing data at a satellite link control (satellite link control protocol, SLC) layer and a message data convergence (message data convergence protocol, MDCP) layer and that is the BeiDou network device 200. The BeiDou short message converged communication platform 24 may be configured for a function of processing data at an application (application layer protocol, APP) layer.

Because the BeiDou communication system 10 performs communication through a satellite link, main features of the BeiDou communication system 10 are a long delay (about 270 ms in a single direction) and a high link loss. Currently, the BeiDou communication system 10 mainly supports a burst short message service, and does not support link status management, mobility management, broadcast control information, or the like.

The BeiDou network device 200 may work in a duplex mode, and may receive and send data at the same time.

Figure 2:
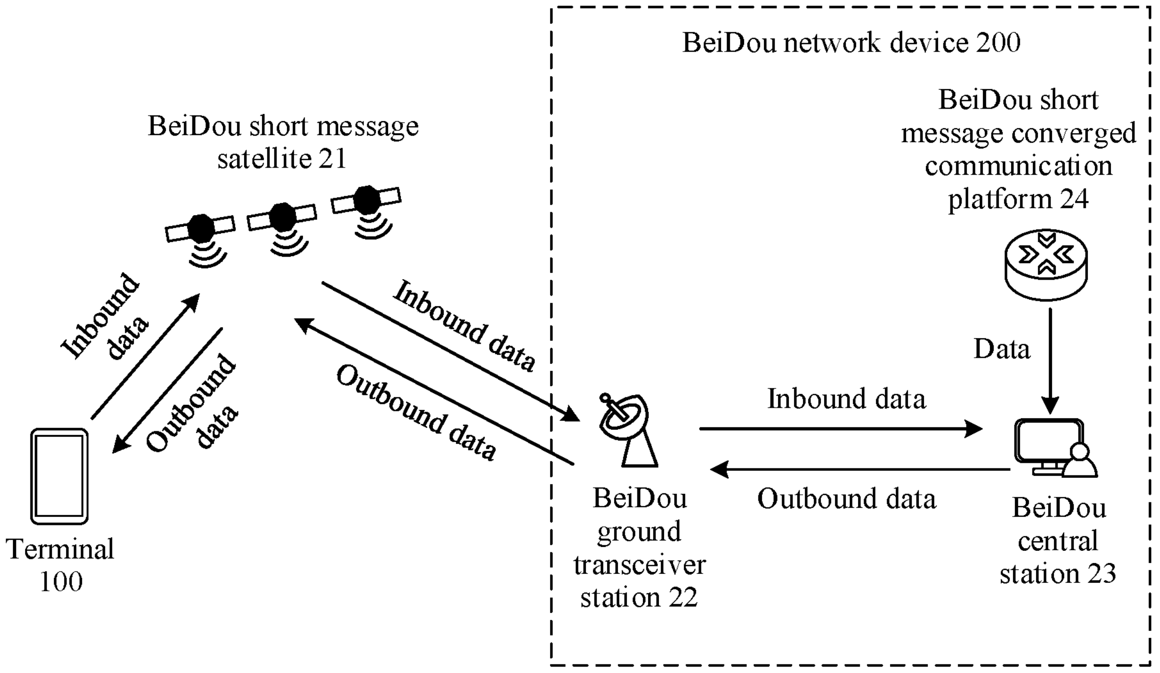
FIG. 2 is a schematic diagram of a data inbound and outbound transmission process in a BeiDou communication system according to an embodiment of this application.

In an embodiment of this application, a process in which the terminal 100 sends data to the BeiDou network device 200 may be referred to as inbound transmission. The data sent by the terminal 100 to the BeiDou network device 200 may be referred to as inbound data. A process in which the BeiDou network device 200 sends data to the terminal 100 may be referred to as outbound transmission. The data sent by the BeiDou network device 200 to the terminal 100 may be referred to as outbound data. As shown in FIG. 2, the terminal 100 may send the inbound data to the BeiDou short message satellite 21, and then the BeiDou short message satellite 21 sends the inbound data to the BeiDou ground transceiver station 22. The BeiDou ground transceiver station 22 may send the inbound data to the BeiDou central station 23. The BeiDou central station 23 in the BeiDou network device 200 may send the outbound data to the BeiDou ground transceiver station 22. Then, the BeiDou ground transceiver station 22 sends the outbound data to the BeiDou short message satellite 21. The BeiDou short message satellite 21 sends the outbound data to the terminal 100.

The following describes a protocol encapsulation architecture of inbound data of the BeiDou communication system 10 provided in embodiments of this application.

Figure 3A:
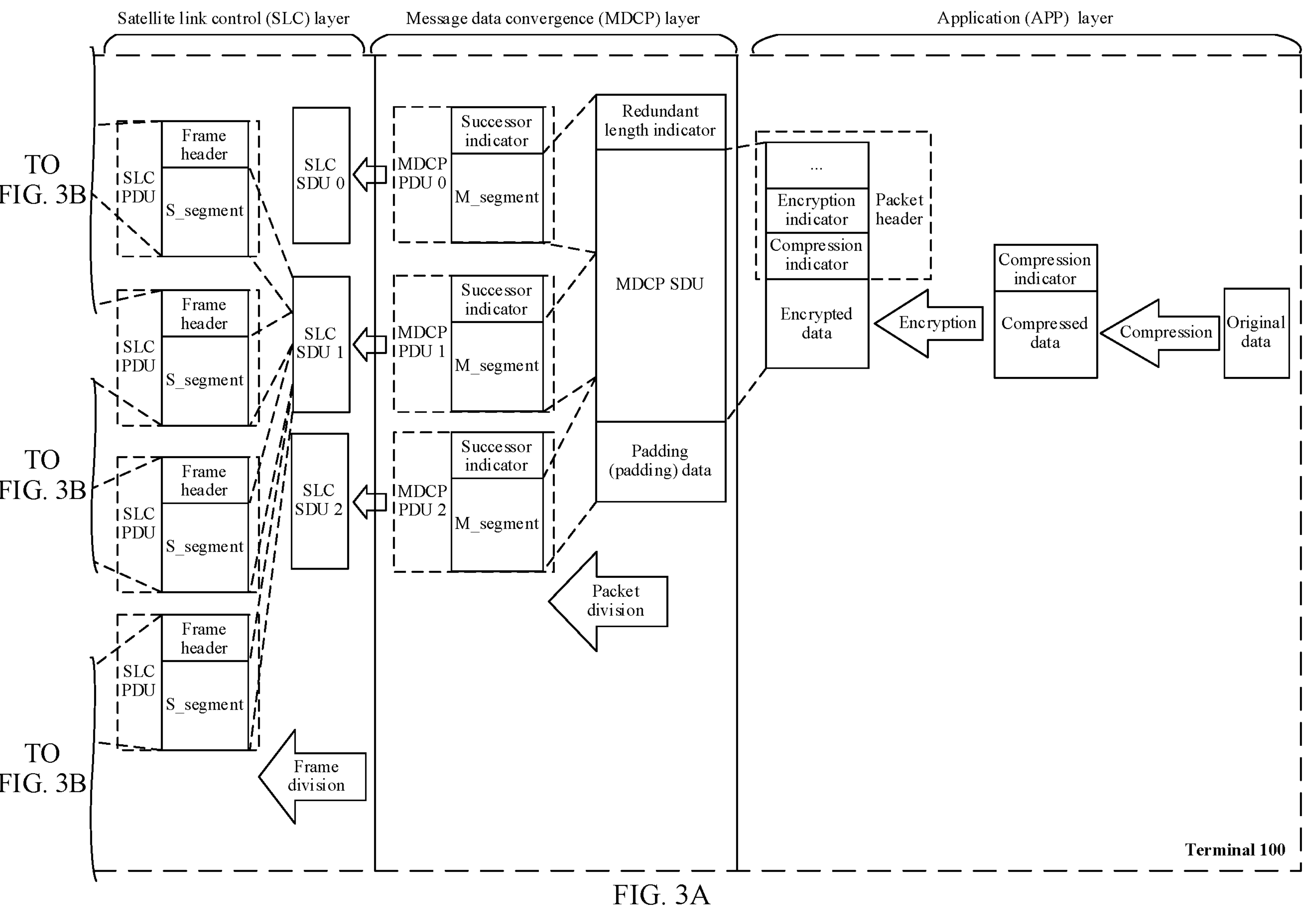
FIG. 3A and FIG. 3B are a schematic diagram of a protocol encapsulation architecture of inbound data of a BeiDou communication system 10 according to an embodiment of this application.
Figure 3B:
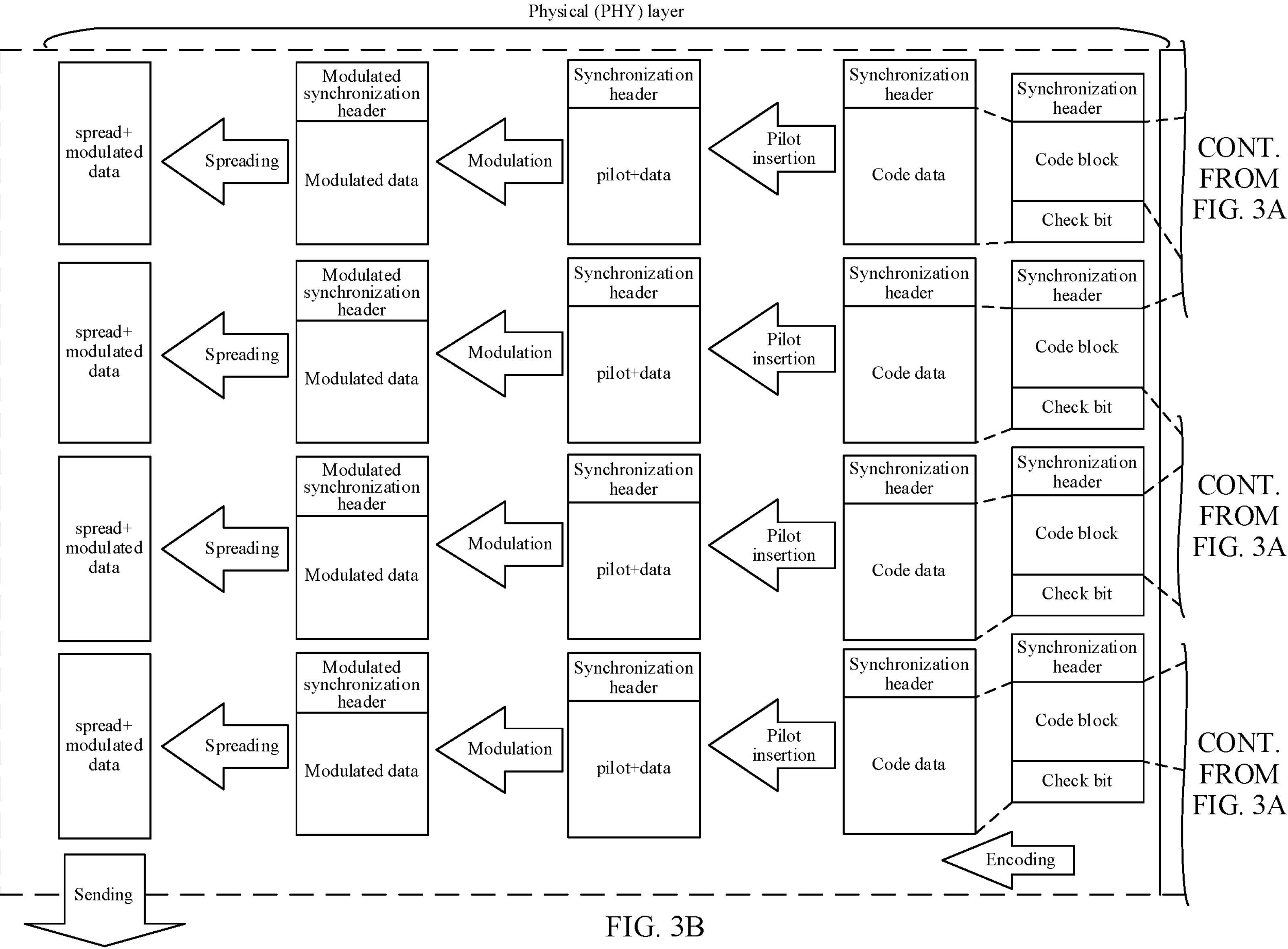

FIG. 3A and FIG. 3B are a schematic diagram of a protocol encapsulation architecture of inbound data of the BeiDou communication system 10 according to an embodiment of this application.

As shown in FIG. 3A and FIG. 3B, a BeiDou packet transport protocol layer on the terminal 100 may be divided into an application (application layer protocol, APP) layer, a message data convergence (message data convergence protocol, MDCP) layer, a satellite link control (satellite link control protocol, SLC) layer, and a physical (physical layer protocol, PHY) layer.

When the terminal 100 sends data to the BeiDou network device 200, a working procedure at the BeiDou packet transport protocol layer on the terminal 100 may be as follows.

At the APP layer, the terminal 100 may compress the original data into compressed data according to a compression algorithm, and add a compression indicator field to the front of the compressed data. The compression indicator field may indicate a compression algorithm type of the compressed data. Then, the terminal 100 may encrypt the compressed data to obtain encrypted data, and add an encryption algorithm field to a header of the encrypted data. The encryption algorithm field indicates an encryption algorithm type of the encrypted data. The terminal 100 may encapsulate the encrypted data, the compression indicator field, and an encryption indicator field into an application layer packet and deliver the application layer packet to the MDCP layer. The application layer packet includes a packet header and packet data. The packet header includes the compression indicator field, the encryption indicator field, and the like. The packet data includes the foregoing encrypted data.

Optionally, the terminal 100 may alternatively encrypt the compression indicator field and the compressed data together, to obtain encrypted data.

At the MDCP layer, the terminal 100 may obtain, through an inter-layer interface, the application layer packet delivered at the APP layer, and use the application layer packet as an MDCP service data unit (service data unit, SDU). At the MDCP layer, the terminal 100 may add padding (padding) data to the tail of the MDCP SDU until a specified length, and add a redundant length indicator field to a header of the MDCP SDU. The redundant length indicator field may indicate a length of the padding data. The terminal 100 may segment the padding data and an MDCP SDU to which the redundant length indicator field is added into one or more pieces of MDCP segment (M_segement) data with a fixed length, and add a successor indicator field to a header of each piece of MDCP segment data, to obtain an MDCP protocol data unit (protocol data unit, PDU). In other words, the MDCP PDU includes the M_segement and the successor indicator field. The successor indicator field may indicate that a current MDCP PDU is a start MDCP PDU, an intermediate MDCP PDU, or a last MDCP PDU of a plurality of MDCP PDUs that are sent consecutively, or is an MDCP PDU sent separately.

At the SLC layer, the terminal 100 may obtain, through an inter-layer interface, the MDCP PDU delivered at the MDCP layer, and use the MDCP PDU as an SLC SDU. At the SLC layer, the terminal 100 may segment the SLC SDU into one or more (a maximum of four) pieces of SLC segment (S_segement) data with a fixed length, and add frame header information to a header of each S_segement, to obtain an SLC PDU. The frame header information includes a service data unit alternated indicator (service data unit alternated Indicator, SAI) field, a total frame quantity field, and a frame sequence number field.

The SAI field may indicate whether the SLC PDU belongs to an SLC SDU that is not sent.

The total frame quantity field may indicate a total quantity of SLC PDUs included in an SLC SDU to which the SLC PDU belongs.

The frame sequence number field may indicate a sequence number of the SLC PDU in the SLC SDU to which the SLC PDU belongs.

At the PHY layer, the terminal 100 may obtain, through an inter-layer interface, the SLC PDU delivered at the SLC layer, use the SLC PDU as a code block (code block) at the PHY layer, add a synchronization header to a header of the code block, and add a check bit field to a tail of the code block. In the foregoing BeiDou communication system 10, a cyclic redundancy check (cyclic redundancy check, CRC) may be used to check the code block. Therefore, the check bit field may include a CRC code. The terminal 100 may perform encoding (for example, polar encoding) on the code block and the check bit field, to obtain code data (coded data), and then insert a pilot into the code data, to obtain pilot code data (pilot+data). Then, the terminal 100 sequentially modulates the synchronization header and the pilot code data by using underlying hardware, to obtain modulated data (modulated data). The terminal 100 may spread on the modulated data, to obtain spread modulated data (spread+modulated data). The terminal 100 may send the spread modulated data to the BeiDou short message satellite 21, and the spread modulated data is forwarded to the BeiDou network device 200 through relay performed by the BeiDou short message satellite 21.

The following describes a protocol parsing architecture of inbound data of the BeiDou communication system 10 provided in embodiments of this application.

Figure 4A:
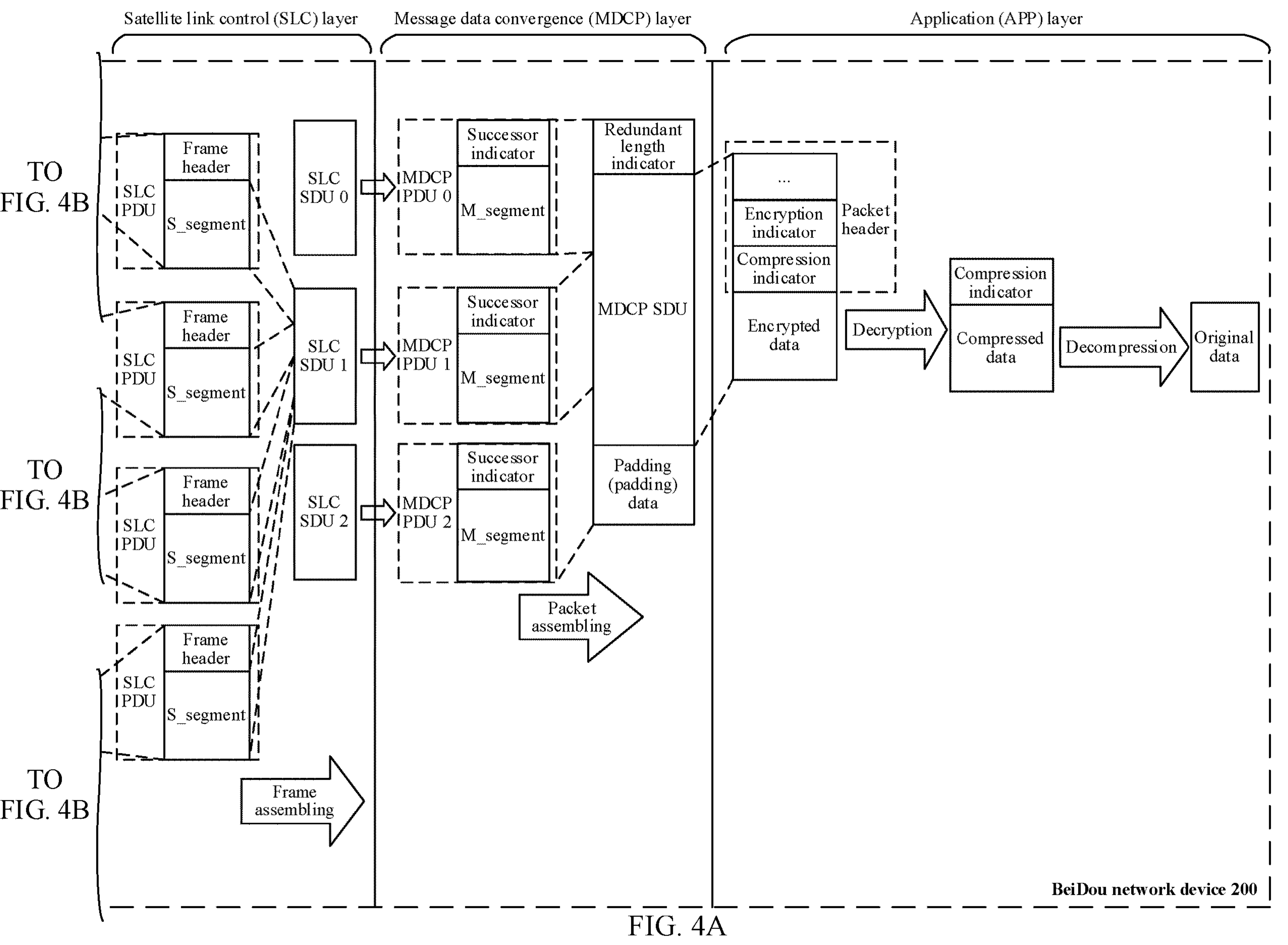
FIG. 4A and FIG. 4B are a schematic diagram of a protocol parsing architecture of inbound data of a BeiDou communication system 10 according to an embodiment of this application.
Figure 4B:
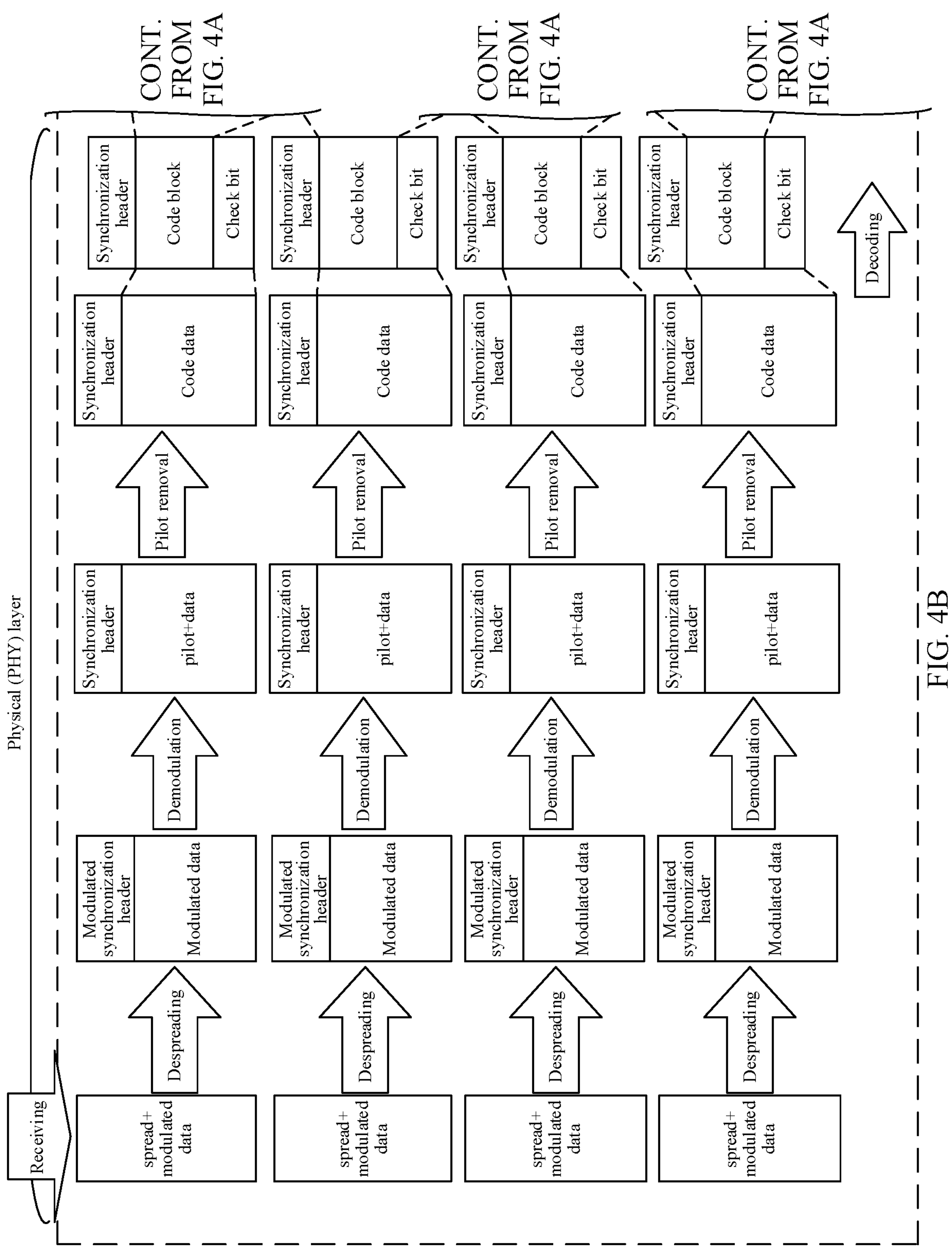

FIG. 4A and FIG. 4B are a schematic diagram of a protocol parsing architecture of inbound data of the BeiDou communication system 10 according to an embodiment of this application.

As shown in FIG. 4A and FIG. 4B, a BeiDou short message transport protocol layer of the BeiDou network device 200 may be divided into an application (application layer protocol, APP) layer, a message data convergence (message data convergence protocol, MDCP) layer, a satellite link control (satellite link control protocol, SLC) layer, and a physical (physical layer protocol, PHY) layer. The BeiDou network device 200 may include the BeiDou ground transceiver station 22, the BeiDou central station 23, and the BeiDou short message converged communication platform 24. The BeiDou ground transceiver station 22 may be configured to be responsible for protocol processing at the PHY layer. The BeiDou central station 23 may be configured to be responsible for protocol processing at the SLC layer and the MDCP layer. The BeiDou short message converged communication platform 24 may be configured to be responsible for protocol processing at the APP layer.

When the BeiDou network device 200 receives data sent by the terminal 100, a working procedure at the BeiDou short message transport protocol layer of the BeiDou network device 200 may be as follows.

At the PHY layer, the BeiDou network device 200 may obtain modulated and spread pilot code data sent by the terminal 100. The BeiDou network device 200 may despread the received spread modulated data (spread+modulated data), to obtain modulated data (modulated data). Then, the BeiDou network device 200 may demodulate the modulated data, to obtain pilot code data (pilot+data). Next, the BeiDou network device 200 removes pilot information from the pilot code data, to obtain code data (code data). Then, the BeiDou network device 200 may decode the code data, and verify integrity of a code block (code block) by using check data in a check bit field. If the code block is integral, the BeiDou network device 200 may extract the code block (code block), and deliver the code block to the SLC layer through an inter-layer interface as an SLC PDU at the SLC layer.

At the SLC layer, the BeiDou network device 200 may splice SLC PDUs belonging to a same SLC SDU into one SLC SDU based on frame header information of the SLC PDUs. The BeiDou network device 200 may deliver the SLC SDU to the MDCP layer through an inter-layer interface, and use the SLC SDU as an MDCP PDU at the MDCP layer.

At the MDCP layer, the BeiDou network device 200 may splice all MDCP PDUs belonging to a same MDCP SDU into one MDCP SDU. The BeiDou network device 200 may deliver the MDCP SDU to the APP layer through an inter-layer interface, use the MDCP SDU as an APP layer packet received at the APP layer.

At the APP layer, the BeiDou network device 200 may decrypt and decompress the application layer packet based on a packet header of the application layer packet, to obtain original data.

In embodiments of this application, the foregoing protocol processing process is merely an example for description. A specific operation of protocol processing is not limited in this application.

The following describes a protocol encapsulation architecture of outbound data of the BeiDou communication system 10 provided in embodiments of this application.

Figure 5A:
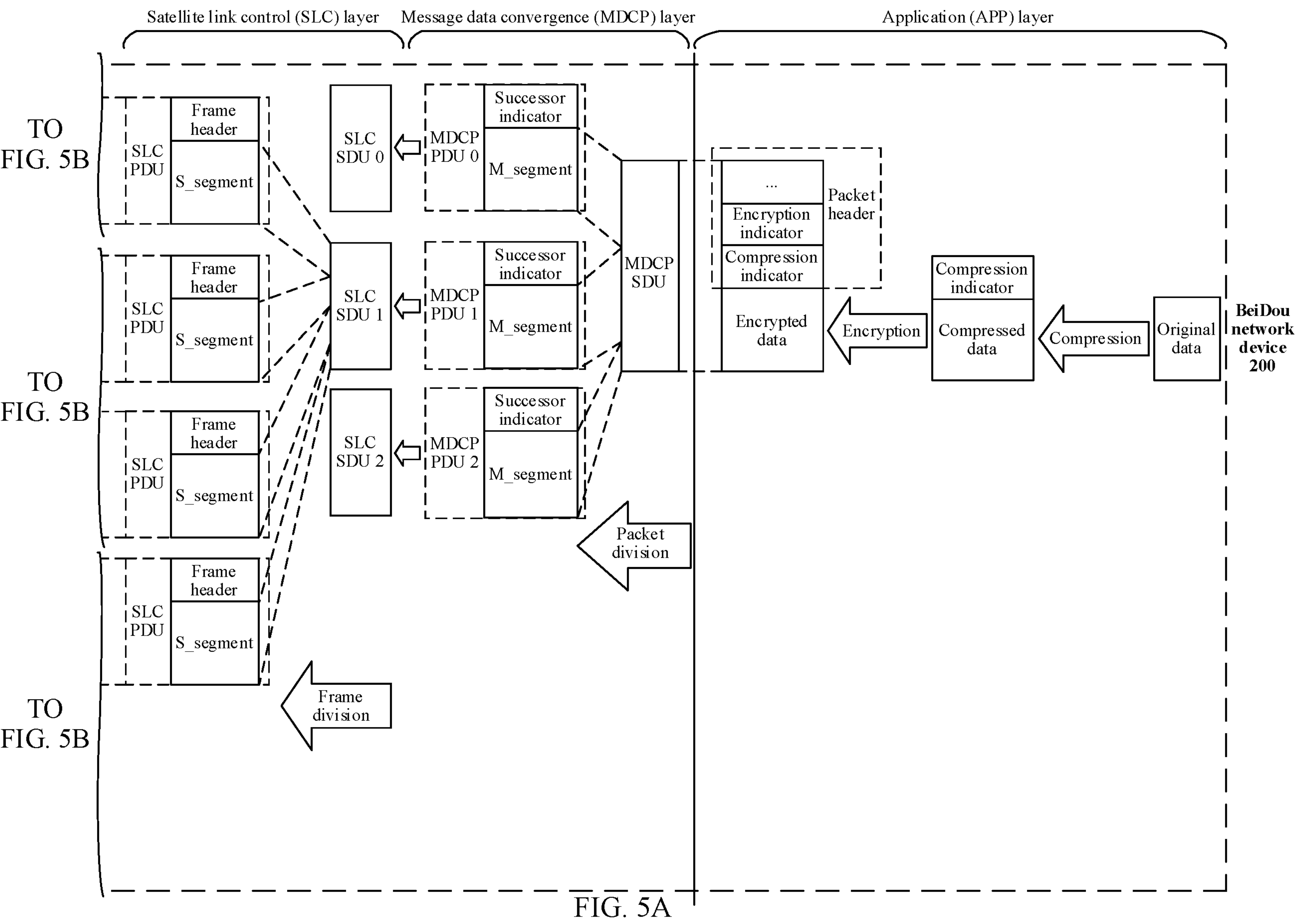
FIG. 5A and FIG. 5B are a schematic diagram of a protocol encapsulation architecture of outbound data of a BeiDou communication system 10 according to an embodiment of this application.
Figure 5B:
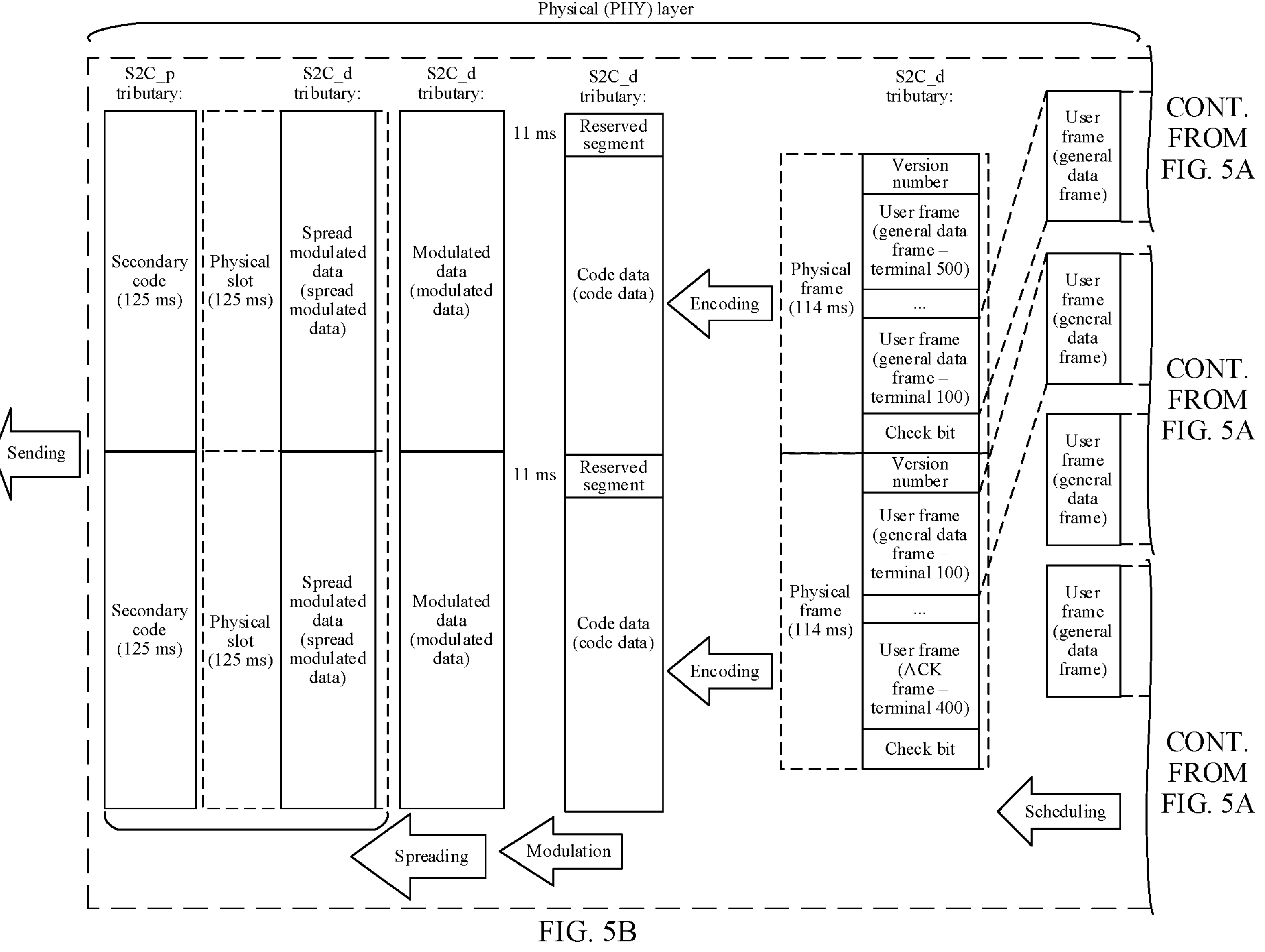

FIG. 5A and FIG. 5B are a schematic diagram of a protocol encapsulation architecture of outbound data of the BeiDou communication system 10 according to an embodiment of this application.

As shown in FIG. 5A and FIG. 5B, the BeiDou short message transport protocol layer in the BeiDou network device 200 may be divided into an application (application layer protocol, APP) layer, a message data convergence (message data convergence protocol, MDCP) layer, a satellite link control (satellite link control protocol, SLC) layer, and a physical (physical layer protocol, PHY) layer. The BeiDou network device 200 may include the BeiDou ground transceiver station 22, the BeiDou central station 23, and the BeiDou short message converged communication platform 24. The BeiDou ground transceiver station 22 may be configured to be responsible for protocol processing at the PHY layer. The BeiDou central station 23 may be configured to be responsible for protocol processing at the SLC layer and the MDCP layer. The BeiDou short message converged communication platform 24 may be configured to be responsible for protocol processing at the APP layer.

When the BeiDou network device 200 sends data to the terminal 100, a working procedure at the BeiDou short message transport protocol layer of the BeiDou network device 200 may be as follows.

At the APP layer, the BeiDou network device 200 may compress the original data into compressed data according to a compression algorithm, and add a compression indicator field to the front of the compressed data. The compression indicator field may indicate a compression algorithm type of the compressed data. Then, the BeiDou network device 200 may encrypt the compressed data to obtain encrypted data, and add an encryption algorithm field to a header of the encrypted data. The encryption algorithm field indicates an encryption algorithm type of the encrypted data. The BeiDou network device 200 may encapsulate the encrypted data, the compression indicator field, and an encryption indicator field into an application layer packet and deliver the application layer packet to the MDCP layer. The application layer packet may include a packet header and packet data. The packet header may include the compression indicator field, the encryption indicator field, and the like. The packet data includes the foregoing encrypted data.

Optionally, in a possible implementation, the BeiDou network device 200 segments an MDCP SDU into a plurality of MDCP PDUs at the MDCP layer. The BeiDou network device 200 may transmit the plurality of MDCP PDUs to the SLC layer of the BeiDou network device 200.

At the MDCP layer, the BeiDou network device 200 may obtain, through an inter-layer interface, the application layer packet delivered at the APP layer, and use the application layer packet as an MDCP SDU. At the MDCP layer, the BeiDou network device 200 may segment one MDCP SDU into one or more pieces of MDCP segment (M_segement) data with a fixed length, and add a successor indicator field to a header of each piece of MDCP segment data, to obtain an MDCP PDU. In other words, the MDCP PDU includes the M_segement and the successor indicator field. The successor indicator field may indicate that a current MDCP PDU is a start MDCP PDU, an intermediate MDCP PDU, or a last MDCP PDU of a plurality of MDCP PDUs that are sent consecutively, or is an MDCP PDU sent separately.

At the SLC layer, the BeiDou network device 200 may obtain, through an inter-layer interface, the MDCP PDU delivered at the MDCP layer, and use the MDCP PDU as an SLC SDU. At the SLC layer, the BeiDou network device 200 may segment the SLC SDU into one or more (a maximum of four) pieces of SLC segment (S_segement) data with a fixed length, and add frame header information to a header of each S_segement, to obtain an SLC PDU.

At the PHY layer, the BeiDou network device 200 may obtain, through an inter-layer interface, the SLC PDU delivered at the SLC layer. The BeiDou network device 200 may obtain SLC PDUs of one or more users from the SLC layer. The BeiDou network device 200 may splice SLC PDUs of a plurality of users together, add a frame header (for example, a version number) of a physical frame as a code block (code block) at the PHY layer, add a check bit (for example, a cyclic redundancy check (cyclic redundancy check, CRC) code) to a tail of the code block, and performing encoding (for example, polar encoding) on the code block and the CRC code. An encoded physical frame and a reserved segment may form code data of a telegraphic message tributary (S2C_d tributary) of a physical slot with a fixed length. The BeiDou network device 200 may separately place a plurality of SLC PDUs of one user into different physical frames. Then, the BeiDou network device 200 combines the code data of the S2C_d tributary and pilot information of a pilot tributary (S2C_p tributary) into pilot code data, namely, outbound data. The BeiDou network device 200 may send the outbound data to the BeiDou short message satellite 21, and the outbound data is forwarded to the terminal 100 through relay performed by the BeiDou short message satellite 21.

It may be understood that the pilot information of the S2C_p tributary is related to a satellite beam. When a satellite beam number is known information, the pilot information of the S2C_p tributary is also known and does not need to be decoded. However, the code data of the S2C_d tributary needs to be decoded.

The following describes a protocol parsing architecture of outbound data of the BeiDou communication system 10 provided in embodiments of this application.

Figure 6A:
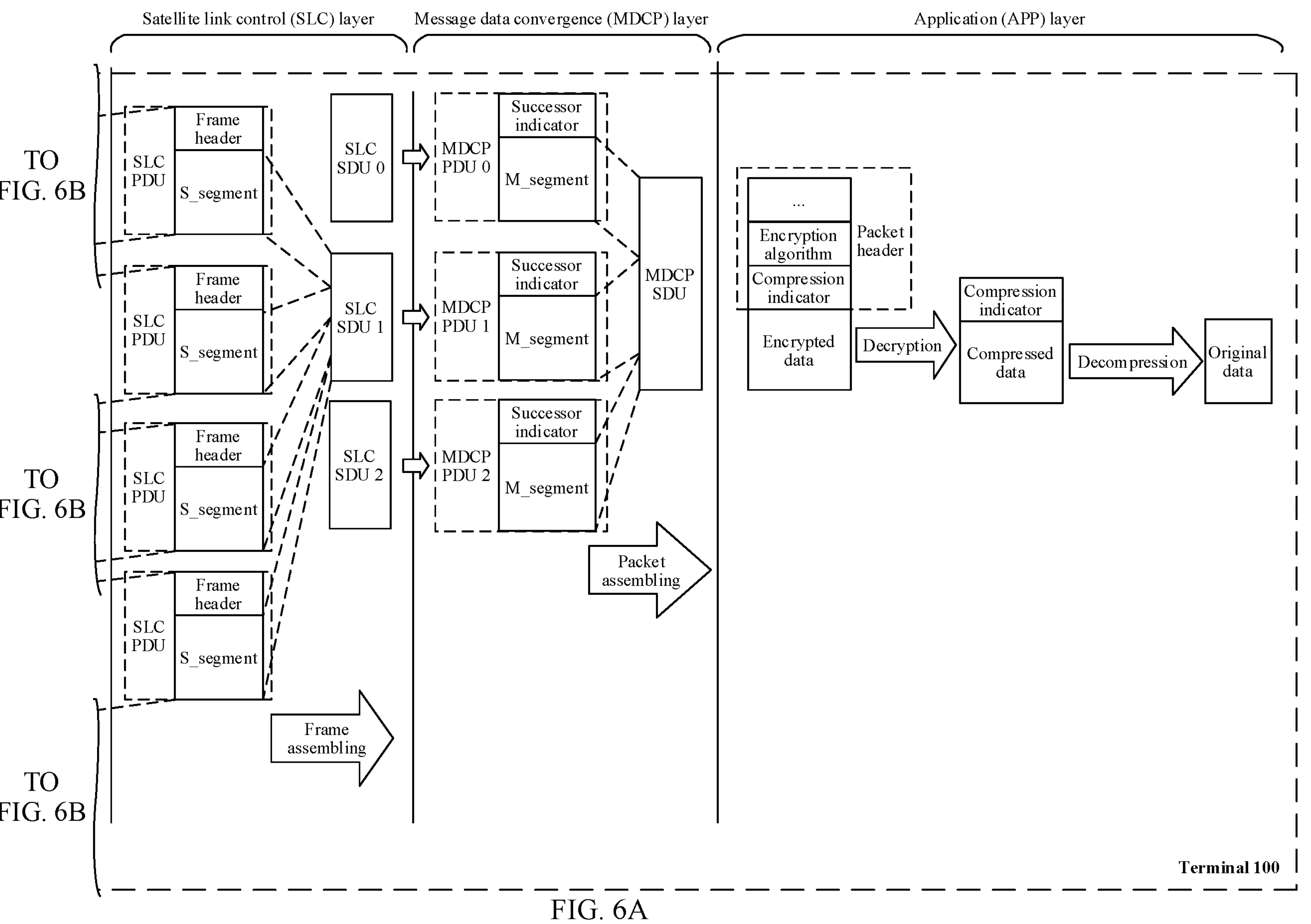
FIG. 6A and FIG. 6B are a schematic diagram of a protocol parsing architecture of outbound data of a BeiDou communication system 10 according to an embodiment of this application.
Figure 6B:
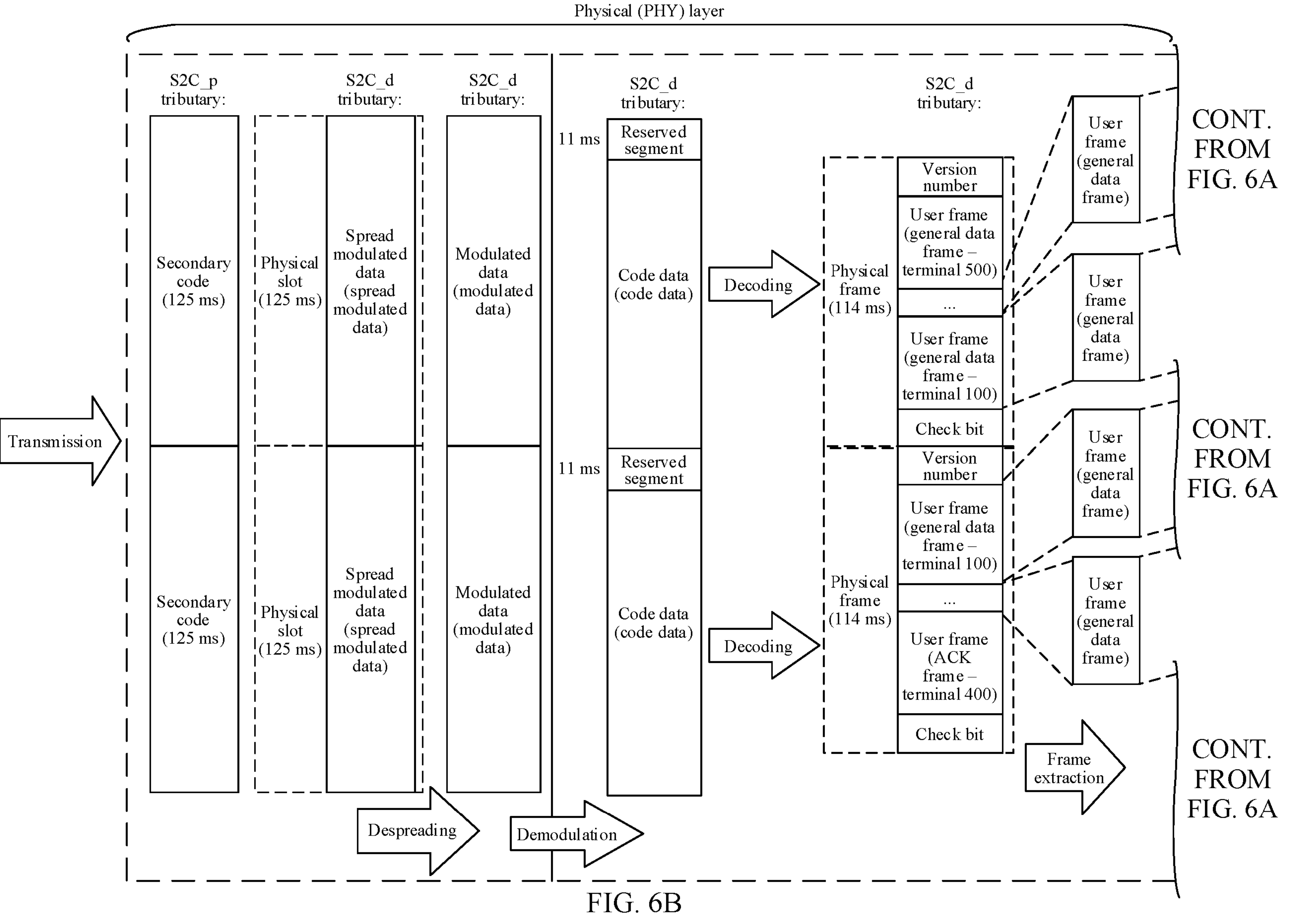

FIG. 6A and FIG. 6B are a schematic diagram of a protocol parsing architecture of outbound data of the BeiDou communication system 10 according to an embodiment of this application.

As shown in FIG. 6A and FIG. 6B, a BeiDou short message transport protocol layer on the terminal 100 may be divided into an application (application layer protocol, APP) layer, a message data convergence (message data convergence protocol, MDCP) layer, a satellite link control (satellite link control protocol, SLC) layer, and a physical (physical layer protocol, PHY) layer.

When the terminal 100 receives data sent by the BeiDou network device, a working procedure at the BeiDou short message transport protocol layer on the terminal 100 may be as follows.

At the PHY layer, the terminal 100 may obtain modulated and spread pilot code data sent by the BeiDou network device 200. The terminal 100 may despread the received spread modulated data (spread+modulated data), to obtain modulated data (modulated data). Then, the terminal 100 may demodulate the modulated data, to obtain pilot code data (pilot+data). Next, the terminal 100 may remove pilot information from the pilot code data to obtain code data (code data). Then, the terminal 100 may decode the code data, and verify integrity of a code block (code block) by using check data in a check bit field. If the code block is integral, the terminal 100 may extract the code block (code block), and deliver the code block to the SLC layer through an inter-layer interface as an SLC PDU at the SLC layer.

Herein, the pilot code data is the outbound data sent by the BeiDou network device 200, and the outbound data includes code data of an S2C_d tributary and pilot information of a pilot tributary (S2C_p tributary).

At the SLC layer, the terminal 100 may splice SLC PDUs belonging to a same SLC SDU into one SLC SDU based on frame header information of the SLC PDUs. The terminal 100 may deliver the SLC SDU to the MDCP layer through an inter-layer interface, and use the SLC SDU as an MDCP PDU at the MDCP layer.

At the MDCP layer, the terminal 100 may splice all MDCP PDUs belonging to a same MDCP SDU into one MDCP SDU. The terminal 100 may deliver the MDCP SDU to the APP layer through an inter-layer interface, and use the MDCP SDU as an APP layer packet received at the APP layer.

At the APP layer, the terminal 100 may decrypt and decompress the application layer packet based on a packet header of the application layer packet, to obtain original data.

In embodiments of this application, the foregoing protocol processing process is merely an example for description. A specific operation of protocol processing is not limited in this application.

In the BeiDou communication system 10, the terminal 100 may generate a user frame at the SLC layer. Frame header information of the user frame may include a user ID field. The user ID field includes a user ID of the terminal 100. The user frame generated by the terminal 100 may include an SLC PDU, an acknowledgement character (acknowledge character, ACK) frame, and an application layer receipt frame. The BeiDou network device 200 may also generate a user frame at the SLC layer. Frame header information of the user frame may include a user ID field. The user ID field includes a user ID of a terminal that receives the user frame. The user frame generated by the BeiDou network device 200 may also include an SLC PDU, an ACK frame, and an application layer receipt frame.

Figure 7:
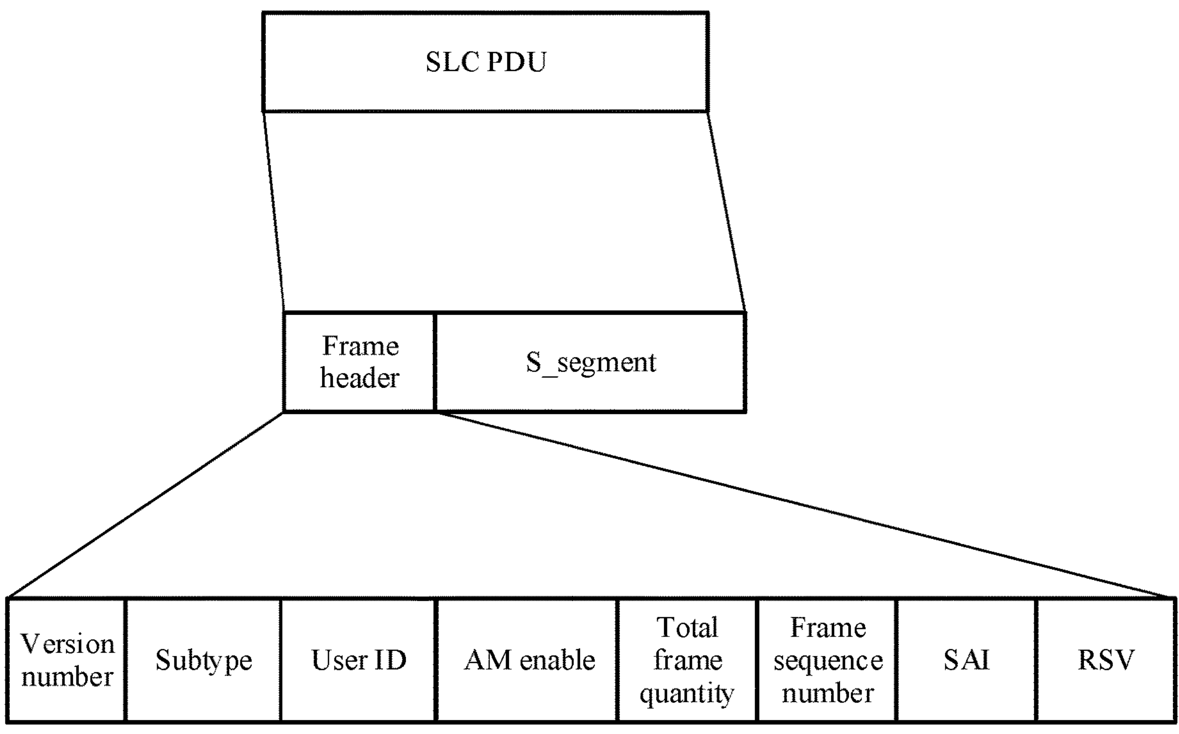
FIG. 7 is a schematic diagram of a frame format of an SLC frame according to an embodiment of this application.

FIG. 7 shows a frame format of an inbound SLC PDU according to an embodiment of this application.

As shown in FIG. 7, during inbound transmission, frame header information of an SLC PDU sent by the terminal 100 to the BeiDou network device 200 may include a version number field, a subtype indicator field, a user identity (identity document, ID) field, an acknowledgement mode enable (AM enable) field, a total frame quantity field, a frame sequence number field, a SAI field, and a reserved (reserve, RSV) field.

The version number field may indicate a version of a BeiDou communication protocol. The version number field may be used to support evolution of the BeiDou communication protocol for a format of each frame type. A length of the version number field is not limited in embodiments of this application.

The subtype field may indicate that a frame type of a user frame sent by the terminal 100 is a general data frame, namely, an SLC PDU. A length of the subtype field may be 1 bit. For example, if a value of the subtype field is "0", it indicates that the user frame is a general data frame, namely, an SLC PDU. When a value of the subtype field is "1", it indicates that the user frame sent by the terminal 100 is an ACK frame. Because the SLC PDU is a general data frame sent by the terminal 100, the value of the subtype field in the SLC PDU is "0". A length of the subtype field is not limited in embodiments of this application.

The user ID field may indicate a user ID of the terminal 100. The user ID field includes the user ID of the terminal 100.

The AM enable field may indicate whether the terminal 100 transmits the SLC PDU in an acknowledgement mode. A length of the AM enable field and a specific value of the AM enable field are not limited in embodiments of this application.

The total frame quantity field may indicate a total quantity of SLC PDUs included in an SLC SDU in which the SLC PDUs are located. A length of the total frame quantity field may be 2 bits. When the length of the total frame quantity field is 2 bits, one SLC PDU may include a maximum of four SLC PDUs.

The frame sequence number field may indicate a sequence number of the SLC PDU in the SLC SDU. A length of the frame sequence number field may be 2 bits. The length of the frame sequence number field is not limited in embodiments of this application.

The service data unit alternated indicator (service data unit alternated Indicator, SAI) field may occupy 1 bit. When the terminal 100 transmits the SLC PDU in the acknowledgement mode, that is, the value of the AM enable field is "1", the SAI field may indicate whether the SLC PDU is a retransmitted SLC PDU. When the terminal 100 transmits the SLC PDU in an unacknowledgement mode, that is, the value of the AM enable field is "0", the SAI field may be reserved for another function.

The RSV field may be used for byte alignment of frame header data and reserved for another function. A length of the RSV field may be 4 bits, or may be another quantity of bits. The length of the RSV field is not limited in embodiments of this application.

It may be understood that the frame format of the outbound SLC PDU shown in FIG. 7 is merely an example. An arrangement order of information element parameters in the fields of the frame header information is not limited in embodiments of this application.

Figure 8:
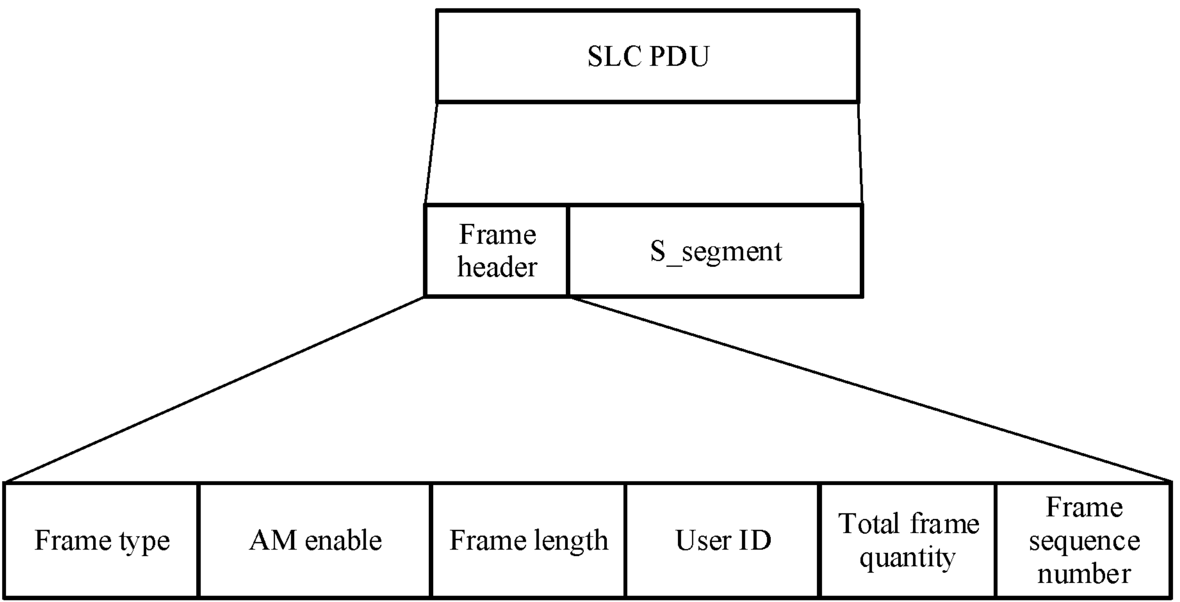
FIG. 8 is a schematic diagram of a frame format of another SLC frame according to an embodiment of this application.

FIG. 8 shows a frame format of an outbound SLC PDU according to an embodiment of this application.

As shown in FIG. 8, during outbound transmission, frame header information of an SLC PDU sent by the BeiDou network device 200 to the terminal 100 may include a frame type field, an acknowledgement mode enable (acknowledge mode enable, AM enable) field, a frame length field, a user ID field, a total frame quantity field, and a frame sequence number field.

The frame type field may indicate a type of an SLC frame. A length of the frame type field may be 2 bits. The length of the frame type field is not limited in embodiments of this application.

The AM enable field indicates whether the BeiDou network device 200 transmits the SLC PDU in an acknowledgement mode. A length of the AM enable field may be 1 bit. If a value of the AM enable field is a first value (for example, 1), it indicates that the terminal 100 needs to reply to the BeiDou network device 200 with an ACK after receiving the SLC PDU sent by the BeiDou network device 200. If a value of the AM enable field is a second value (for example, 0), it indicates that the terminal 100 does not need to reply to the BeiDou network device 200 with an ACK after receiving the SLC PDU of the BeiDou network device 200. A length of the AM enable field and a specific value of the AM enable field are not limited in embodiments of this application.

The frame length field is used to identify a length of the SLC frame. The length of the frame length field may be 8 bits. The length of the frame length field is not limited in embodiments of this application.

The user ID field may indicate that the SLC PDU is sent by the BeiDou network device 200 to the terminal 100. The user ID field may include a user ID of the terminal 100.

The total frame quantity field may indicate a total quantity of SLC PDUs included in an SLC SDU in which the SLC PDUs are located. A length of the total frame quantity field may be 2 bits. When the length of the total frame quantity field is 2 bits, one SLC PDU may include a maximum of four SLC PDUs.

The frame sequence number field may indicate a sequence number of the SLC PDU in the SLC SDU. A length of the frame sequence number field may be 2 bits. The length of the frame sequence number field is not limited in embodiments of this application.

It may be understood that the frame format of the outbound SLC PDU shown in FIG. 8 is merely an example. An arrangement order of information element parameters in the fields of the frame header information is not limited in embodiments of this application.

Figure 9:
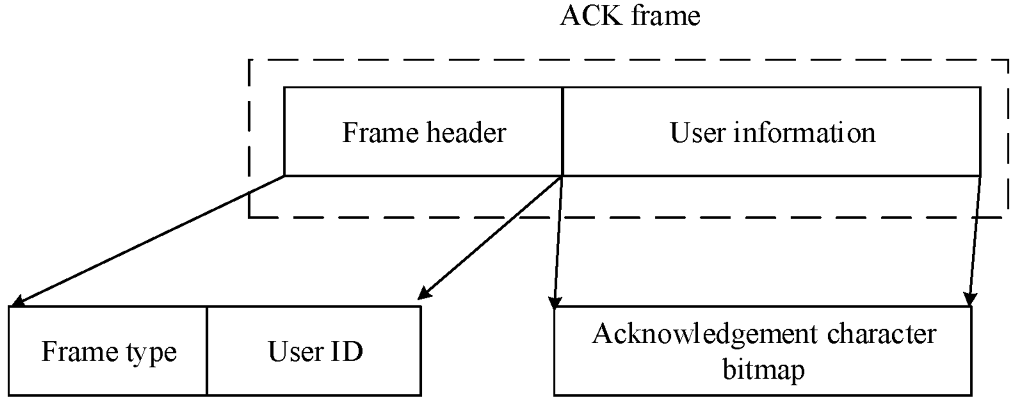
FIG. 9 is a schematic diagram of a frame format of an ACK frame according to an embodiment of this application.

FIG. 9 shows a frame format of an ACK frame according to an embodiment of this application.

As shown in FIG. 9, the ACK frame may include frame header information and user information. The frame header information may include a frame type field and a user ID field. The frame type field may indicate a type of the ACK frame. A length of the frame type field may be 2 bits. The length of the frame type field is not limited in embodiments of this application. The user ID field may indicate a user ID of a terminal that sends or receives the ACK frame.

The ACK frame indicates whether the terminal 100 or the BeiDou network device 200 that sends the ACK frame successfully receives the SLC SDU.

It may be understood that the frame format of the ACK frame shown in FIG. 9 is merely an example. An arrangement order of information element parameters in the field of the frame header information is not limited in embodiments of this application.

FIG. 10 shows a frame format of an application layer receipt frame according to an embodiment of this application.

As shown in FIG. 10, the application layer receipt frame may include frame header information and user information. The frame header information may include a frame type field and a user ID field. The frame type field may indicate a type of the application layer receipt frame. A length of the frame type field may be 2 bits. The length of the frame type field is not limited in embodiments of this application. The user ID field may indicate a user ID of a terminal that sends or receives the application layer receipt frame.

The application layer receipt frame indicates whether the terminal 100 or the BeiDou network device 200 that sends the application layer receipt frame successfully parses a received application layer packet.

It may be understood that the frame format of the application layer receipt frame shown in FIG. 10 is merely an example. An arrangement order of information element parameters in the fields of the frame header information is not limited in embodiments of this application.

In embodiments of this application, binary data in the user ID field included in the frame header information of the user frame may indicate a mobile phone number of the terminal

100. Currently, an E.164 number format released by the International Telecommunication Union (international telecommunication union, ITU) is used for mobile phone numbers in countries around the world. E.164 is an international public telephone numbering plan that is defined by the International Telecommunication Union and that is used in a public switched telephone network (public switched telephone network, PSTN) and some data networks, and defines a format of a specific code number. E.164 defines a maximum of 15 digits. A complete number has an international call prefix. E.164 defines a specific format of a mobile subscriber international integrated service digital network number (mobile subscriber international integrated service digital network number, MSISDN).

The MSISDN is a number that needs to be dialed by a calling subscriber to call a subscriber on a mobile communication network. The following describes a format of the MSISDN. Table 1 shows an example of the format of the MSISDN.

TABLE 1

| MSISDN orchestration | | | |
|---|---|---|---|
| Format 1 | Country code CC | National destination code NDC | Subscriber number SN |
| Structure expression of the format 1 | Country code CC | (N1N2N3) | (H0H1H2H3 + ABCD) |
| Example | 86 | 139 | 6666 6666 |

As shown in Table 1, the MSISDN may be orchestrated in a manner shown in the format 1. A specific format shown in the format 1 is: format 1: MSISDN=CC+NDC+SN (CC=a country code; NDC=a national destination code; SN=a subscriber number). In other words, the MSISDN includes the country code (country code, CC), the national destination code (national destination code, NDC), and the subscriber number (subscriber number, SN).

Based on current distribution of defined country codes, a maximum length of the CC is four digits. For example, a CC of Guam is 1671. Most CCs are two digits, for example, 86 of China.

The NDC may also be referred to as a network access number. Each sovereign country may authorize one or more network operators to establish and operate a mobile network. For example, in the top three mobile operators of China, network access numbers of China Mobile are 134 to 139, 150 to 152, and 188, network access numbers of China Unicom are 130 to 132, 185, and 186, and network access numbers of China Telecom are 133, 153, 180, and 189.

The SN includes a maximum of eight digits. For example, an SN subscriber number in the Chinese Mainland includes eight digits.

A structure of the MSISDN in the format 1 may be the following expression:

$$MSISDN = CC + N_1N_2N_3 + H_0H_1H_2H_3 + ABCD$$

An NDC part may include three digits, namely, N1N2N3, and an SN part may include eight digits, namely, H0H1H2H3 and ABCD. The four digits, namely, H0H1H2H3, may be an identification number of a home location register (home location register, HLR) of each mobile service local network in the SN, and ABCD is a mobile customer code.

As shown in Table 1, the MSISDN may be "8613966666666", where "86" is a CC code, "139" may be an NDC code or N1N2N3, and "66666666" may be an SN code or may be H0H1H2H3+ABCD.

In this embodiment of this application, a part (namely, the NDC and the SN) that is of the MSISDN and that does not include the CC may be referred to as a national identity number of a terminal, or may be referred to as a mobile phone number, or may be referred to as a mobile number. For ease of description, the part that is of MSISDN and that does not include the CC is referred to as the mobile number. In China, the mobile number of a terminal is a decimal string of 11 digits.

Generally, the MSISDN is encoded through a binary coded decimal (binary coded decimal, BCD) encoding. In a BCD encoding form, a decimal number is stored by using four bits. In this way, a capacity of 44 bits is needed for BCD encoding for an 11-digit mobile number (namely, an MSISDN excluding the CC). For example, as shown in Table 2, a mobile number "13966666666" may be encoded into a character string of 44 bits in a binary format through BCD encoding.

TABLE 2

<table>
<tr><td colspan="12">NDC</td><td colspan="16">SN</td></tr>
<tr><td colspan="4">1</td><td colspan="4">3</td><td colspan="4">9</td><td colspan="4">6</td><td colspan="4">6</td><td colspan="4">6</td><td colspan="4">6</td></tr>
<tr><td>0</td><td>0</td><td>0</td><td>1</td><td>0</td><td>0</td><td>1</td><td>1</td><td>1</td><td>0</td><td>0</td><td>1</td><td>0</td><td>1</td><td>1</td><td>0</td><td>0</td><td>1</td><td>1</td><td>0</td><td>0</td><td>1</td><td>1</td><td>0</td><td>0</td><td>1</td><td>1</td><td>0</td></tr>
<tr><td colspan="28">SN</td></tr>
<tr><td colspan="12"></td><td colspan="4">6</td><td colspan="4">6</td><td colspan="4">6</td><td colspan="4">6</td></tr>
<tr><td colspan="12"></td><td>0</td><td>1</td><td>1</td><td>0</td><td>0</td><td>1</td><td>1</td><td>0</td><td>0</td><td>1</td><td>1</td><td>0</td><td>0</td><td>1</td><td>1</td><td>0</td></tr>
</table>

As shown in Table 2, each decimal character in the mobile number "13966666666" may be encoded into a 4-bit binary character string. For example, the decimal character "1" may be encoded into a 4-bit binary character string "0001" in the BCD encoding manner. The decimal character "3" may be encoded into a 4-bit binary character string "001" in the BCD encoding manner. The decimal character "9" may be encoded into a 4-bit binary character string "1001" in the BCD encoding manner. The decimal character "6" may be encoded into a 4-bit binary character string "0110" in the BCD encoding manner. In this way, the mobile number "13966666666" may be encoded into a 44-bit binary character string "0001 0011 1001 0110 0110 0110 0110 0110 0110 0110 0110" in the BCD encoding manner. In this way, the user ID field needs a capacity of 44 bits, resulting in high frame header overheads.

Embodiments of this application provide a data compression method in a BeiDou communication system. The data compression method may be applied to the terminal 100. The compression method may include: The terminal 100 may encode a user ID of the terminal 100 into binary first data, where the user ID may include second data and third data, the first data includes binary fourth data and binary fifth data, the fourth data is obtained by compressing the sixth data, the sixth data is obtained by compressing the second data, a data length of the sixth data is less than that of the second data, and the fifth data is obtained by encoding the third data; and the terminal 100 fills the first data in a user ID field included in frame header information of a first user frame. The first data in the user ID field may indicate the user ID of the terminal 100.

The user ID may be a mobile number of the terminal 100. The second data may be NDC data in the mobile number of the terminal 100. The third data may be SN data in the mobile number of the terminal 100.

According to the compression method provided in embodiments of this application, the terminal 100 can compress the user ID of the terminal 100 according to the compression method, and encode a compressed user ID, and then fill an encoded compressed user ID in the user ID field. In this way, a bit occupied by the user ID field can be reduced, to reduce frame header overheads.

FIG. 11A shows an example of a schematic flowchart of a data compression method in a BeiDou communication system according to an embodiment of this application. For example, a user ID is a mobile number. The data compression method may include the following steps.

S101: The terminal 100 encodes a mobile number of the terminal 100 into binary data D1. The mobile number includes an NDC 1 and an SN 1. The data D1 includes data D2 and data D3. The data D2 is obtained by encoding data D4. The data D4 is obtained by compressing the NDC 1. A data length of the data D4 is less than that of the NDC 1. The data D3 is obtained by encoding the SN 1.

TABLE 3

| Mobile number | NDC 1 | SN 1 |
|---|---|---|
| After compression | Data D4 | SN 1 |
| After encoding | Data D2 | Data D3 |
| | Data D1 | |

As shown in Table 3, the mobile number of the terminal 100 may include the NDC 1 and the SN 1. The terminal 100 may compress the NDC 1 into the data D4 at an SLC layer. The data length of the data D4 is less than that of the NDC 1. Then, the data D4 is encoded into the data D2, and the SN 1 is encoded into the data D3. The data D2 and the data D3 may be combined into the data D1.

In this embodiment of this application, the terminal 100 may be referred to as a first terminal. The user ID of the terminal 100 may be referred to as a first user ID. The data D1 may be referred to as first data. The NDC 1 may be referred to as second data. The SN 1 may be referred to as third data. The data D2 may be referred to as fourth data. The data D3 may be referred to as fifth data. The data D4 may be referred to as sixth data.

If the mobile number of the terminal 100 is a number of another country other than China, the terminal 100 may convert the mobile number into a mobile number of China. In an embodiment of this application, the mobile number of China may be referred to as a national mobile number, and the mobile number in another country other than China may be referred to as a foreign mobile number.

In a possible implementation, the terminal 100 may map the foreign mobile number to the national mobile number as a whole. The terminal 100 may have a mapping table. The mapping table may include an international number and a corresponding national number.

Optionally, in a possible implementation, the terminal 100 may convert an NDC in the foreign mobile number into a national NDC, and then combine the national NDC and an SN in the foreign mobile number into a mobile number.

In a possible implementation, the terminal 100 may compress the NDC 1 into the data D4, and then the terminal 100 encodes the data D4 into the data D2.

Optionally, in a possible implementation, that the terminal 100 compresses the NDC 1 into the data D4 may include: The terminal 100 maps the NDC 1 to the data D4 in a mapping table relationship. The data D4 is a short message communication identity document (short message communication identity document, SMCID) that is in the mapping table relationship and that corresponds to the NDC 1. The SN 1 may be converted into a binary short message communication subscriber number (short message communication subscriber number, SMCSN). In other words, the data D1 includes an encoded SMCID and an encoded SMCSN. The terminal 100 has a mapping relationship table of an NDC and an SMCID.

For example, a mapping relationship table of an NDC and an SMCID of a national mobile number may be shown in Table 4.

TABLE 4

| NDC | SMCID<br>0 (for a dedicated terminal) |
|---|---|
| 130 to 139 | NDC-130 + 1 (1 to 10) |
| 144 to 159 | NDC-134 + 1 (11 to 26) |
| 162 | 27 |
| 165 | 28 |
| 166 | 29 |
| 167 | 30 |
| 170 to 178 | NDC-140 + 1 (31 to 39) |
| 180 to 189 | NDC-140 (40 to 49) |
| 191 | 50 |
| 195 | 51 |
| 198 | 52 |
| 199 | 53 |

As shown in Table 4, an NDC number segment of current national mobile numbers ranges from 13× to 19×. Therefore, mapping conversion from the NDC to the SMCID may be implemented based on the mapping table shown in Table 4. When the NDC is 130, the NDC may be mapped to 1 in the SMCID. When the NDC is 139, the NDC may be mapped to 10 in the SMCID. When the NDC is in a number segment 130 to 139, the NDC may be mapped to 1 to 10 in the SMCID. When the NDC is in a number segment 144 to 159, the NDC may be mapped to 11 to 26 in the SMCID. When the NDC is 162, the NDC may be mapped to 27 in the SMCID. When the NDC is 165, the NDC may be mapped to 28 in the SMCID. When the NDC is 166, the NDC may be mapped to 29 in the SMCID. When the NDC is 167, the NDC may be mapped to 30 in the SMCID. When the NDC is in a number segment 170 to 178, the NDC may be mapped to 31 to 39 in the SMCID. When the NDC is in a number segment 180 to 189, the NDC may be mapped to 40 to 49 in the SMCID. When the NDC is 191, the NDC may be mapped to 50 in the SMCID. When the NDC is 195, the NDC may be mapped to 51 in the SMCID. When the NDC is 198, the NDC may be mapped to 52 in the SMCID. When the NDC is 199, the NDC may be mapped to 53 in the SMCID.

A value of the SMCID usually ranges from 0x00 to 0x7F. There are 128 SMCID types. A 7-bit binary number may accommodate 128 SMCIDs. The SMCID is fixedly set to 0 for the dedicated terminal, and remaining 127 SMCIDs are used by a civil terminal.

Further, optionally, Table 4 shows only 54 SMCIDs, and remaining 74 SMCIDs may be used as reserved resources. If an operator subsequently adds a new NDC, a mapping relationship between the new NDC and a reserved SMCID may be added to the mapping relationship table shown in Table 3 in an over-the-air (over the air, OTA) upgrade manner.

The NDC in Table 4 may be referred to as the second data, and the SMCID may be referred to as the sixth data. Table 4 includes NDCs of a plurality of values and SMCIDs of a plurality of values. Each NDC of a value corresponds to an SMCID of a value.

In this way, in some feasible examples, 7-bit binary data may be obtained by encoding the SMCID. If a binary data obtained by encoding the SMCID is less than seven bits, 0 may be added to a most significant bit of the data, to ensure that the data includes seven bits.

A value of the SN ranges from 0 to 99999999. Therefore, a 27-bit binary number is required to accommodate all SNs. If an SMCSN obtained by encoding the SN is less than 27 bits, 0 may be added to a most significant bit of the SMCSN, to ensure that the SMCSN includes 27 bits.

For example, the mobile number "13966666666" is used as an example for description. In the mobile number "13966666666", the NDC is "139", and the SN is "66666666". The NDC "139" may be mapped to "10" in Table 3, namely, the data D4. "10" may be encoded into binary data "1010". Because "01" is less than 7 bits, 0 is added to most significant bits, to obtain 7-bit binary data "0001010". In other words, an encoding result of the NDC "139" is "0001010", namely, the data D2. "66666666" may be encoded into binary data "1111111001010000000101010" that is a piece of 26-bit binary data less than 27 bits. 0 is added to a most significant bit to obtain a 27-bit binary data "0111111001010000000000". In other words, an encoding result of the SN "66666666" is "0111111001010000000000", namely, the data D3. The terminal 100 may combine the encoding result of the NDC "139" and the encoding result of the SN "66666666" into an encoding result of the mobile number "13966666666", namely, 34-bit binary data "00010100111110010100000000000", namely, the binary data D1.

Optionally, in another possible implementation, that the terminal 100 compresses the NDC 1 into the data D4 may include: The terminal 100 subtracts a preset offset value from the NDC 1 to obtain data D5. A data length of the data D5 is less than that of the NDC 1.

Currently, an NDC number segment ranges from 13× to 19×, and a value of a 7-bit SMCID ranges from 0 to 127. Therefore, the SMCID can be obtained by subtracting the preset offset value from the NDC.

For example, the preset offset value may be 100. The mobile number "13966666666" is used as an example for description. In the mobile number "13966666666", the NDC is "139", and the SN is "66666666". The NDC "139" minus the preset offset value "100" is equal to "39", namely, the data D5. "39" may be encoded into binary data "1001". Because "100111" is less than 7 bits, 0 is added to a most significant bit, to obtain 7-bit code data "0100111". In other words, an encoding result of the NDC "139" is "010011", namely, the data D2. "66666666" may be encoded into binary data "11.1001001010000000101010", that is a piece of 26-bit binary data less than 27 bits. 0 is added to a most significant bit to obtain a 27-bit binary data "0111111001010000000000". In other words, an encoding result of the SN "66666666" is "0111111001010000000000", namely, the data D3. The terminal 100 may combine the encoding result of the NDC "139" and the encoding result of the SN "66666666" into an encoding result of the mobile number "13966666666", namely, 34-bit binary data "0100111011111110010100000010110", namely, the binary data D1.

It may be understood that the preset offset value may be 100, or may be another value. This is not limited in embodiments of this application.

S102: The terminal 100 fills the data D1 in a user ID field included in frame header information of a first user frame.

The terminal 100 may fill, at the SLC layer, the data D1 in the user ID field included in the frame header information of the first user frame. For example, when the user ID is the mobile number "13966666666", the binary data D1 filled in the user ID field may be 34-bit binary data "0001010011101001010000000101010" or "010011011001001010000000101010".

Further, after the terminal 100 performs step S102, the terminal 100 may send the first user frame to the BeiDou network device 200.

Further, the BeiDou network device 200 may decode and decompress, at an SLC layer, the user ID in the user ID field in the first user frame, to obtain an original user ID. For example, the user ID is a mobile number. The BeiDou network device 200 decodes and decompresses, at the SLC layer, a binary user ID field, to obtain an n-bit mobile number.

Specifically, the BeiDou network device 200 may decode the binary user ID in the user ID field, namely, the data D2 in the data D1, into the data D4, and decode the data D3 in the data D1 into the SN1. Then, the data D4 is decompressed into the NDC 1.

In a possible implementation, the user ID field of the first user frame may include a user ID compression indicator field. The user ID compression indicator field indicates a user ID compression method. The BeiDou network device 200 may decompress the data D4 into the NDC 1 according to the compression method indicated by the user ID compression indicator field.

Optionally, in another possible implementation, the terminal 100 compresses the NDC 1 into the data D4 in only one manner. For example, the terminal 100 maps the NDC 1 to the data D4 in the mapping table relationship, where the data D4 is an SMCID corresponding to the NDC 1 in the mapping table relationship. In this case, the BeiDou network device 200 decompresses the data D4 according to the method for compressing the NDC 1 by the terminal 100, to obtain the NDC 1. For example, the BeiDou network device 200 may search the mapping relationship table for the NDC 1 corresponding to the data D4.

Optionally, in another possible implementation, if the terminal 100 compresses the NDC 1 into the data D4 in a plurality of manners, the BeiDou network device 200 may decompress the data D4 in a preset order of decompression methods. For example, if the terminal 100 compresses the NDC 1 into the data D4 according to three methods, for example, a compression method 1, a compression method 2, and a compression method 2. The first user frame sent by the terminal 100 does not indicate the method for compressing the user ID field by the terminal 100. User ID decompression methods, namely, a decompression method 1 (which may decompress data compressed according to the compression method 1), a decompression method 2 (which may decompress data compressed according to the compression method 2), and a decompression method 3 (which may decompress data compressed according to the compression method 3) are preset in the BeiDou network device 200. A preset order of the decompression methods is that the decompression method 1 is first used to perform decompression. If decompression fails, the decompression method 2 is used to perform the decompression. If decompression still fails, the decompression method 3 is used to perform decompression.

It may be understood that, in this embodiment of this application, the user ID of the terminal 100 is not limited to the mobile number of the terminal 100, and may be an MSISDN, an international mobile subscriber identification number (international mobile subscriber identification number, IMSI), an international mobile equipment identity (international mobile equipment identity, IMEI), or the like of the terminal 100.

According to the data compression method in a BeiDou communication system provided in this embodiment of this application, the terminal 100 may compress the user ID. When the user ID is an 11-bit mobile number, BCD encoding is used in the conventional technology, and the user ID field needs to occupy 44 bits. However, according to the data compression method in this embodiment of this application, the user ID field needs to occupy only 34 bits. In this way, a bit occupied by a user ID field in frame header information of each user frame can be reduced.

The terminal 100 may send the first user frame to the BeiDou network device 200. The first user frame may be used to query information about a cellular network near the terminal 100, a quantity of letters received by the terminal 100, or content of a letter received by the terminal 100. Alternatively, the first user frame may indicate whether the terminal 100 successfully receives last time, a user frame sent by the BeiDou network device, or indicate whether the terminal 100 successfully parses an application layer packet sent by the BeiDou network device 200. When the BeiDou network device 200 receives the first user frame of the terminal 100, the BeiDou network device 200 may reply the terminal 100 with a second user frame. The second user frame may indicate a query result of the information about the cellular network near the terminal 100, or the quantity of letters received by the terminal 100, or the content of the letter received by the terminal 100. Alternatively, the second user frame may further indicate whether the BeiDou network device 200 successfully receives the first user frame sent by the terminal 100, or may further indicate whether the BeiDou network device 200 successfully parses the application layer packet sent by the terminal 100. The BeiDou network device 200 sends the user ID of the terminal 100 in the frame header information of the second user frame to the terminal 100. In this way, the terminal 100 may further learn that the second user frame is sent by the BeiDou network device 200 to the terminal 100.

In the conventional technology, the user ID in the user ID field needs to occupy a large quantity of bits. As a result, frame header overheads are high.

Embodiments of this application provide the compression method. The compression method may be applied to the BeiDou network device 200. The compression method may include: The BeiDou network device 200 obtains the user ID of the terminal 100; then the BeiDou network device 200 may compress the user ID of the terminal 100, and encode a compressed user ID into binary data D6; and the BeiDou network device 200 fills the data D6 in the user ID field included in the frame header information of the second user frame.

The user ID may be the mobile number of the terminal 100.

According to the compression method provided in embodiments of this application, the BeiDou network device 200 may compress the user ID of the terminal 100 according to the compression method, encode the compressed user ID, and then fill the encoded compressed user ID in the user ID field. In this way, the bit occupied by the user ID field can be reduced, to reduce frame header overheads.

FIG. 11B shows an example of a schematic flowchart of a data compression method in a communication system according to an embodiment of this application. For example, a user ID is a mobile number. The data compression method may include the following steps.

S201: The BeiDou network device 200 obtains a user ID of the terminal 100.

The BeiDou network device 200 may obtain the user ID of the terminal 100 from a user ID field of a received first user frame of the terminal 100.

In a possible implementation, the BeiDou network device 200 parses, as the user ID (for example, a mobile number "13966666666" of the terminal 100), binary data in the obtained user ID field in the first user frame sent by the terminal 100.

Optionally, in another possible implementation, the BeiDou network device 200 may obtain binary data in the user ID field in the first user frame of the terminal 100. The BeiDou network device 200 may directly fill the binary data in the user ID field in a user ID field of a second user frame. The BeiDou network device 200 does not need to perform steps S202 and S203.

S202: The BeiDou network device 200 compresses the user ID of the terminal 100 into data D6, and encodes the data D6 into binary data D7. A data length of the data D6 is less than that of the user ID.

The user ID of the terminal 100 may be a mobile number of the terminal 100. The mobile number includes NDC 1 and SN 1. The BeiDou network device 200 may compress the NDC 1 in the mobile number to obtain SMCID 1. A data length of the SMCID 1 is less than that of the NDC 1. The data D6 is the SMCID 1 and the SN 1. Then, the BeiDou network device 200 may encode the SMCID 1 and the SN 1, to obtain the binary data D7.

The BeiDou network device 200 compresses the NDC 1 to obtain the SMCID 1. For details, refer to the implementation process in which the terminal 100 compresses the NDC 1 into the data D4 in step S101. Details are not described herein again.

For example, the user ID of the terminal 100 may be the mobile number of the terminal 100, for example, "13966666666". The NDC 1 may be "139". The SN 1 may be "66666666". If the BeiDou network device 200 maps the NDC 1 to the SMCID 1 according to the method in step S102, the BeiDou network device 200 may compress the NDC 1 "139" into "10". If the BeiDou network device 200 obtains the SMCID 1 by subtracting a preset offset value from the NDC 1 according to the compression method in step S102, for example, the preset offset value is 100, the BeiDou network device may compress the NDC 1 "139" into "39".

When "139" is compressed into "10", "13966666666" may be eventually encoded into the binary data D7, namely, "0001010011111100101000000101010". When "139" is compressed into “39”, “13966666666” may be eventually encoded into the binary data D7, namely, “0100111011111111001010000000101010”.

S203: The BeiDou network device 200 fills the data D7 in the user ID field included in frame header information of the second user frame.

The BeiDou network device 200 may fill the data D7 in the user ID field included in the frame header information of the second user frame. For example, when the user ID is the mobile number “13966666666”, binary data D1 filled in the user ID field may be 34-bit binary data “00001001111111100010000000010100” or “01001101111111100010000000010100”.

Further, after the BeiDou network device 200 performs step S203, the BeiDou network device 200 may send the second user frame to the terminal 100.

It may be understood that, in this embodiment of this application, the user ID of the terminal 100 is not limited to the mobile number of the terminal 100, and may be an MSISDN, an international mobile equipment identity (international mobile equipment identity, IMEI), or the like of the terminal 100.

According to the data compression method in the BeiDou communication system provided in this embodiment of this application, the BeiDou network device 200 can compress the user ID of the terminal 100. When the user ID is an n-bit mobile number, BCD encoding is used in the conventional technology, and the user ID field needs to occupy 44 bits. However, according to the data compression method in this embodiment of this application, the user ID field needs to occupy only 34 bits. In this way, a bit occupied by a user ID field in frame header information of each user frame can be reduced.

In some scenarios, the terminal 100 may be in a BeiDou network. In other words, the terminal 100 does not camp in a cellular network. When a BeiDou communication module in the terminal 100 is enabled, the terminal 100 may send a short message to the terminal 300 or obtain a short message, that is sent by the terminal 300, by using the BeiDou network device 200. The terminal 300 may camp in the cellular network, or the terminal 300 may be in the BeiDou network and does not camp in the cellular network. This is not limited herein.

It may be understood that, with reference to FIG. 1, when the terminal 100 sends a message to the terminal 300, the BeiDou short message converged communication platform 24 in the BeiDou network device 200 may determine whether the terminal 300 that receives the message is in the BeiDou network or the cellular network. If the terminal 300 is in the cellular network, the BeiDou short message converged communication platform 24 may send the message to the short message service center 25, and then the short message service center sends the message to the terminal 300.

When the terminal 100 in the BeiDou network sends a message to a terminal 400 in the BeiDou network device, first, the message sent by the terminal 100 is forwarded to the BeiDou ground transceiver station 22 by using the BeiDou short message satellite 21. Then, the BeiDou ground transceiver station 22 sends the message to the BeiDou central station 23, and the BeiDou central station 23 sends the message to the BeiDou short message converged communication platform 24. The BeiDou short message converged communication platform 24 may parse out a user ID of the terminal 400, and determine, based on the user ID of the terminal 400, that the terminal 400 is in the BeiDou network. Then, the BeiDou short message converged communication platform 24 sends the message to the BeiDou central station 23. Then, the BeiDou central station 23 sends the message to the BeiDou ground transceiver station 22. Finally, the BeiDou ground transceiver station 22 sends the message to the terminal 400 by using the BeiDou short message satellite 21.

Scenario 1: The terminal 100 in the BeiDou network sends the message to the terminal 300 in the cellular network.

When the terminal 100 sends the short message to the terminal 300 by using the BeiDou network device 200, the short message may carry the user ID of the terminal 100 and a user ID of the terminal 300. Specifically, the terminal 100 generates a first message packet at an application layer. The first message packet may include specific message content and the user ID of the terminal 300. The terminal 100 may compress at the application layer, the user ID of the terminal 300, encode a compressed user ID into binary data, and then fill the binary data in a packet header of the first message packet. Specifically, the terminal 100 may compress at the application layer, the user ID of the terminal 300, and encode a compressed user ID into binary data according to the method shown in step S101 to step S102. Details are not described herein again. After the first message packet is delivered to an SLC layer, the terminal 100 adds the user ID of the terminal 100, and generates a first user frame. The terminal 100 compresses, at the SLC layer, the user of the terminal 100, encode a compressed user into binary data, and then fill the binary data in frame header information of the first user frame. Specifically, the terminal 100 may compress, at an APP layer, the user ID of the terminal 100, encode a compressed user ID into binary data, and then fill the binary data in the frame header information of the first user frame according to the method shown in step S101 to step S102. Details are not described herein again. Then, the terminal 100 sends the first user frame to the BeiDou network device 200.

After receiving the first user frame, the BeiDou network device 200, namely, the BeiDou central station 23 in the BeiDou network device 200, may decode and decompress, at the SLC layer, a user ID field of the terminal 100 in the first user frame, to obtain the user ID of the terminal 100. Then, the BeiDou network device 200, namely, the BeiDou short message converged communication platform 24 in the BeiDou network device 200, may decode and decompress, at an APP layer, a user ID field of the terminal 300, to obtain the user ID of the terminal 300. Then, the BeiDou network device may send, at the APP layer, a message packet carried in the first message packet to the terminal 300.

Scenario 2: The terminal 100 in the BeiDou network receives the message sent by the terminal 300 in a cellular network.

In some scenarios, only when the terminal 100 automatically sends a request to the BeiDou network device 200, the BeiDou network device 200 forwards, to the terminal 100, a message that is sent by another device to the terminal 100. In this way, transmission resources in the BeiDou communication system can be saved. In addition, a fee for receiving and sending messages by the terminal 100 in the BeiDou network can be reduced. After receiving a message obtaining request sent by the terminal 100, the BeiDou network device 200 may decompress and decode, at an SLC layer, the message request, the user ID of the terminal 100. Then, the user ID of the terminal 100 is stored. The BeiDou network device 200 may obtain a message sent by the terminal 300 to the terminal 100. The BeiDou network device 200 may parse out, at an application layer, the user ID of the terminal 300 included in the message. Then, the BeiDou network device 200 may encapsulate, at an APP layer, the message sent by the terminal 300 into a second message packet. The second message packet may include specific message content and the user ID field of the terminal 300. The BeiDou network device 200 compresses the user ID of the terminal 300, encodes a compressed user ID into binary data, and fills the binary data in the user ID field in a packet header of the second message packet. Specifically, the BeiDou network device 200 may compress, at the APP layer, the user ID of the terminal 300, encode a compressed user ID into binary data, and then fill the binary data in the frame header information of the second message packet according to the method shown in step S201 to step S203. The BeiDou network device 200 may segment the second message packet into one or more user frames when delivering the second message packet to the SLC layer. A plurality of user frames include the second user frame. The BeiDou network device 200 compresses the stored user ID of the terminal 100, encodes a compressed user ID into binary data, and fills the binary data in the user ID field in the frame header information of the second user frame. Specifically, the BeiDou network device 200 may compress, at the SLC layer, the user ID of the terminal 100, encode a compressed user ID into binary data, and then fill the binary data in the frame header information of the second user frame according to the method shown in step S201 to step S203. Details are not described herein again. Then, the BeiDou network device 200 sends the second user frame to the terminal 100.

After receiving the second user frame, the terminal 100 may decode, at an SLC layer, the user ID field of the terminal 100 in the second user frame, to obtain the user ID of the terminal 100. The terminal 100 may decode and decompress, at an APP layer, the user ID field of the terminal 300, to obtain the user ID of the terminal 300.

Optionally, in some other scenarios, the terminal 100 may not need to send a request to the BeiDou network device 200. When the BeiDou network device 200 receives a message sent by another terminal to the terminal 100, the BeiDou network device 200 may send the message to the terminal 100. In this way, the terminal 100 can receive in a timely manner, the message sent by another device to the terminal 100.

The BeiDou network device 200 may obtain a message sent by the terminal 300 to the terminal 100. Then, the BeiDou network device 200 may parse out, at the APP layer, the message sent by the terminal 300, the user ID and the user ID of the terminal 300. Then, the BeiDou network device 200 may encapsulate the message into a second message packet. The second message packet may include specific message content and the user ID field of the terminal 300. The BeiDou network device 200 compresses the user ID of the terminal 300, encodes a compressed user ID into binary data, and fills the binary data in the user ID field of the second message packet. Specifically, the BeiDou network device 200 may compress, at the APP layer, the user ID of the terminal 300, encode a compressed user ID into binary data, and then fill the binary data in a packet header of the second message packet according to the method shown in step S201 to step S203. The BeiDou network device 200 segments the second message packet into one or more user frames when delivering the second message packet to the SLC layer. The one or more user frames include the second user frame. Then, the BeiDou network device 200 compresses the user ID of the terminal 100, encodes a compressed user ID into binary data, and fills the binary data in the user ID field in the frame header information of the second user frame. Specifically, the BeiDou network device 200 may compress, at the SLC layer, the user ID of the terminal 100, encode the compressed user ID into the binary data, and then fill the binary data in the frame header information of the second user frame according to the method shown in step S201 to step S203. Details are not described herein again. Then, the BeiDou network device 200 sends the second user frame to the terminal 100.

Scenario 3: The terminal 100 in the BeiDou network sends a message to the terminal 400 in the BeiDou network.

When the terminal 100 sends a short message to the terminal 400 by using the BeiDou network device 200, the short message may carry the user ID of the terminal 100 and the user ID of the terminal 400. Specifically, the terminal 100 generates a third message packet at an application layer. The third message packet may include specific message content and the user ID of the terminal 400. The terminal 100 may compress, at the application layer, the user ID of the terminal 400, encode a compressed user ID into binary data, and then fill the binary data in a packet header of the first message packet. Specifically, the terminal 100 may compress, at the application layer, the user ID of the terminal 400, and encode the compressed user ID into the binary data according to the method shown in step S101 to step S102. Details are not described herein again. After the first message packet is delivered to an SLC layer, the terminal 100 adds the user ID of the terminal 100, and generates a first user frame. The terminal 100 compresses, at the SLC layer, the user of the terminal 100, encode a compressed user into binary data, and then fill the binary data in frame header information of the first user frame. Specifically, the terminal 100 may compress, at an APP layer, the user ID of the terminal 100, encode the compressed user ID into binary data, and then fill the binary data in the frame header information of the first user frame according to the method shown in step S101 to step S102. Details are not described herein again. Then, the terminal 100 sends the first user frame to the BeiDou network device 200.

After receiving the first user frame, the BeiDou network device 200, namely, the BeiDou central station 23 in the BeiDou network device 200, may decode and decompress, at an SLC layer, a user ID field of the terminal 100 in the first user frame, to obtain the user ID of the terminal 100. Then, the BeiDou network device 200, namely, the BeiDou short message converged communication platform 24 in the BeiDou network device 200, may decode and decompress, at an APP layer, a user ID field of the terminal 400, to obtain the user ID of the terminal 400. The BeiDou short message converged communication platform 24 determines that the terminal 400 is in the BeiDou network, and then compresses and encodes the user ID of the terminal 400, to obtain a compressed and encoded user ID. Then, the BeiDou short message converged communication platform 24 compresses and encapsulates the encoded user ID and the specific message content into a fourth message packet. Then, the BeiDou short message converged communication platform 24 sends the fourth message packet to the BeiDou central station 23. The BeiDou central station 23 may segment the fourth message packet into one or more user frames. The one or more user frames include a fourth user frame. The BeiDou central station 23 compresses and encodes the user ID of the terminal 100, and fills an encoded user ID in a user ID field of the fourth user frame. Then, the BeiDou central station 23 sends the fourth user frame to the BeiDou ground transceiver station 22. The BeiDou ground transceiver station 22 sends the fourth user frame to the terminal 100 by using the BeiDou short message satellite 21. Specifically, the BeiDou network device 200 may compress, at the APP layer, the user ID of the terminal 400, encode a compressed user ID into binary data, and then fill the binary data in a packet header of the fourth message packet according to the method shown in step S201 to step S203. Specifically, the BeiDou network device 200 may compress, at the SLC layer, the user ID of the terminal 100, encode a compressed user ID into binary data, and then fill the binary data in a user ID field in frame header information of the fourth user frame according to the method shown in step S201 to step S203.

After receiving the fourth user frame, the terminal 100 may decode, at the SLC layer, the user ID field of the terminal 100 in the second user frame, to obtain the user ID of the terminal 100. The terminal 100 may decode and decompress, at the APP layer, the user ID field of the terminal 400, to obtain the user ID of the terminal 400.

Scenario 4: The terminal 100 in the BeiDou network receives a message sent by the terminal 400 in the BeiDou network.

For a process in which the terminal 400 sends a message to the terminal 100, refer to the descriptions in Scenario 1 to Scenario 3. Details are not described herein again.

It may be understood that, after receiving the message receiving request of the terminal 100, the BeiDou network device 200 may send, to the terminal 100, the message sent by the terminal 400. Alternatively, after receiving a message sent by the terminal 400, the BeiDou network device 200 may directly send the message to the terminal 100 without a request of the terminal 100. When the BeiDou network device 200 sends, to the terminal 100, the message sent by the terminal 400, the BeiDou network device 200 may obtain the user ID of the terminal 100 from the message sent by the terminal 400. Alternatively, the BeiDou network device 200 may obtain the user ID of the terminal 100 from the request sent by the terminal 100.

In an embodiment of this application, the terminal 300 or the terminal 400 may be referred to as a second terminal, and the user ID of the terminal 300 or the user ID of the terminal 400 may be referred to as a second user ID.

The following first describes an example of the terminal 100 provided in embodiments of this application.

Figure 12:
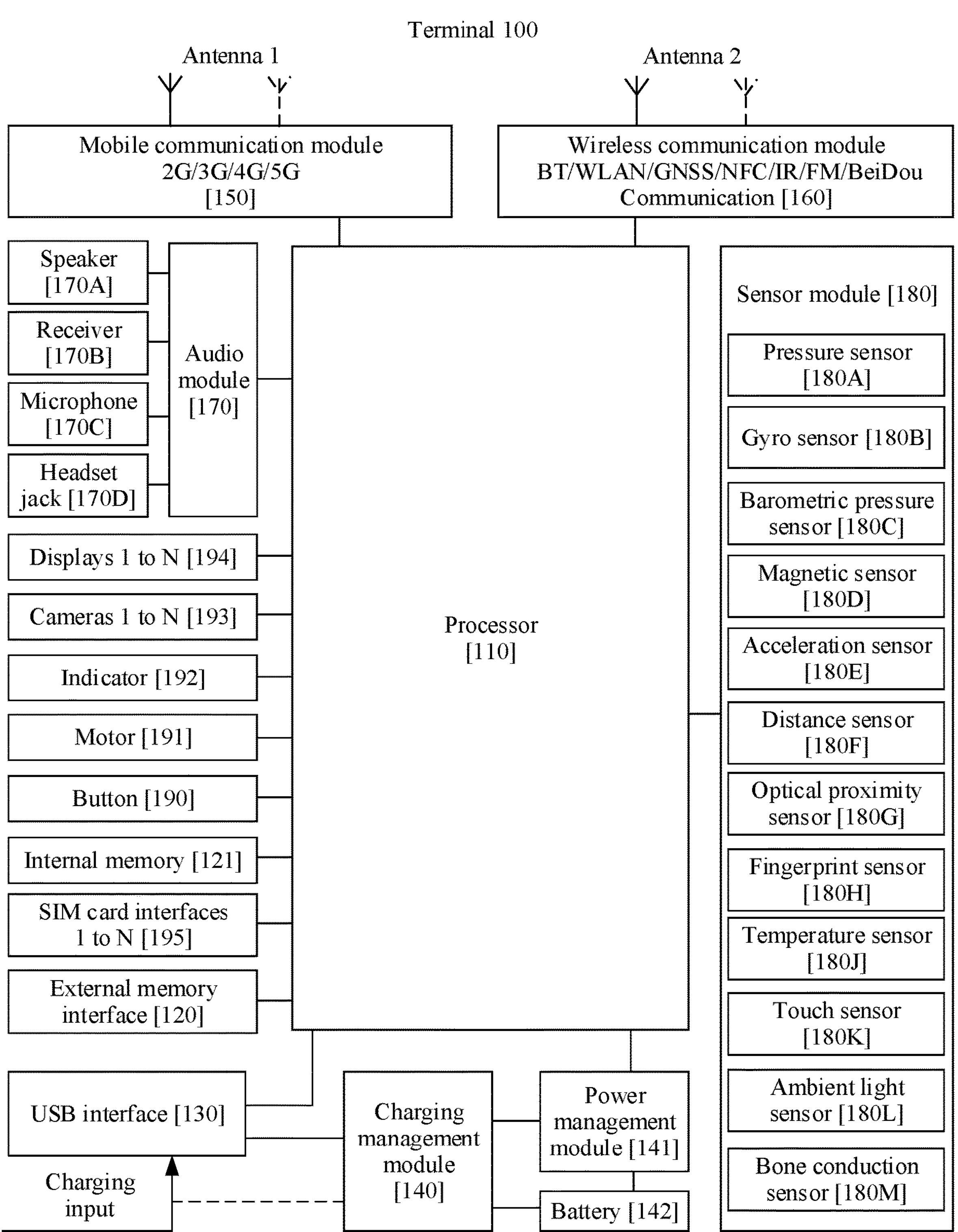
FIG. 12 is a schematic diagram of a structure of a terminal 100 according to an embodiment of this application.

FIG. 12 is a schematic diagram of a structure of the terminal 100 according to an embodiment of this application.

The following uses the terminal 100 as an example to specifically describe embodiments. It should be understood that the terminal 100 may have more or fewer components than those shown in the figure, or two or more components may be combined, or there may be different component configurations. The components shown in the figure may be implemented in hardware including one or more signal processing and/or application-specific integrated circuits, software, or a combination of hardware and software.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement the function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface to implement a photographing function of the terminal 100. The processor 110 communicates with the display 194 through the DSI interface to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The SIM interface may be configured to communicate with the SIM card interface 195, to implement a function of transmitting data to an SIM card or reading data in an SIM card.

The USB interface 130 is an interface that conforms to a USB standard specification, and may be specifically a mini USB interface, a micro USB interface, a USB type-C interface, or the like. The USB interface 130 may be configured to connect a charger to charge the terminal 100, and may also be used to transfer data between the terminal 100 and a peripheral device, or may be configured to connect to a headset for playing audio through the headset. The interface may be further configured to connect to another electronic device such as an AR device.

It may be understood that the interface connection relationship between the modules illustrated in this embodiment of the present invention is merely a schematic illustration, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G and that is applied to the terminal 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal 100, including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), a BeiDou communication module, frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The BeiDou communication module may be configured to communicate with the BeiDou network device 200. The BeiDou communication module may support short message transmission with the BeiDou network device 200.

In some embodiments, the antenna 1 of the terminal 100 is coupled to the mobile communication module 150, and the antenna 2 is coupled to the wireless communication module 160, so that the terminal 100 can communicate with the network and other devices through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and color of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transformation on frequency energy.

The video codec is configured to compress or decompress a digital video. The terminal 100 may support one or more video codecs. In this way, the terminal 100 can play or record videos in various encoding formats, for example, moving picture experts group (moving picture experts group, MPEG) 1, MPEG2, MPEG3, and MPEG4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the terminal 100 may be implemented through the NPU, for example, image recognition, facial recognition, speech recognition, and text understanding.

The internal memory 121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by using the processor 110. The random access memory may be configured to store an executable program (for example, machine instructions) in an operating system or another running program, and may be configured to store data of a user, data of an application, and the like.

The nonvolatile memory may also store an executable program, data of a user, data of an application, and the like, which may be loaded into the random access memory in advance for directly reading and writing by the processor 110.

The terminal 100 may implement an audio function by using the audio module 170, the speaker 170A, the receiver 170B, the microphone 170C, the headset jack 170D, the application processor, and the like, for example, music playing and sound recording.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an electrical audio signal into a sound signal. The terminal 100 may be for listening to music or answering a call in a hands-free mode over the speaker 170A.

The receiver 170B, also referred to as an "earpiece", is configured to convert an electrical audio signal into a sound signal. When a call is answered or speech information is received through the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a short message application icon, an instruction for viewing a short message is performed. When a touch operation whose touch operation intensity is greater than or equal to the first pressure threshold is performed on the short message application icon, an instruction for creating a new short message is executed.

The gyro sensor 180B may be configured to determine a motion gesture of the terminal 100. In some embodiments, an angular velocity of the terminal 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the terminal 100 jitters, calculates, based on the angle, a distance for which a lens module needs to compensate, and allows a lens to cancel the jitter of the terminal 100 through reverse motion, to implement the image stabilization. The gyro sensor 180B may further be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall sensor. The terminal 100 may detect opening and closing of a flip cover by using the magnetic sensor 180D. In some embodiments, when the terminal 100 is a clamshell phone, the terminal 100 may detect opening and closing of a flip cover by using the magnetic sensor 180D. Further, a feature, for example, automatic unlocking of the flip cover is set based on a detected opening or closing state of the leather case or a detected opening or closing state of the flip cover.

The acceleration sensor 180E may detect values of accelerations of the terminal 100 in various directions (generally on three axes). A magnitude and a direction of gravity may be detected when the terminal 100 is still. The acceleration sensor 180E may be further configured to identify a posture of the electronic device, and is used in an application such as switching between a landscape mode and a portrait mode or a pedometer.

The distance sensor 180F is configured to measure a distance. The terminal 100 may measure a distance by using infrared or laser. In some embodiments, in a photographing scenario, the terminal 100 may measure a distance by using the distance sensor 180F to implement quick focusing.

The optical proximity sensor 180G may include, for example, a light emitting diode (LED) and an optical detector, for example, a photodiode. The light emitting diode may be an infrared light emitting diode. The terminal 100 transmits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy based on the temperature detected by the temperature sensor 18J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal 100 at a location different from that of the display 194.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The terminal 100 interacts with a network through the SIM card, to implement functions such as calling and data communication.

The foregoing content describes in detail the method provided in this application. To better implement the foregoing solutions in embodiments of this application, embodiments of this application further provide corresponding apparatuses or devices.

In embodiments of this application, division into functional modules of the terminal 100 and the BeiDou network device 200 may be performed based on the foregoing method examples. For example, each functional module may be obtained through division in correspondence to each function, or at least two functions may be integrated into one processing module. The integrated module may be implemented in a form of hardware, or may be implemented in a form of a software functional module. It should be noted that, in embodiments of this application, division into the modules is an example, is merely logical function division and may be another division during actual implementation.

The following describes in detail a communication apparatus in embodiments of this application with reference to FIG. 13 to FIG. 16.

Figure 13:
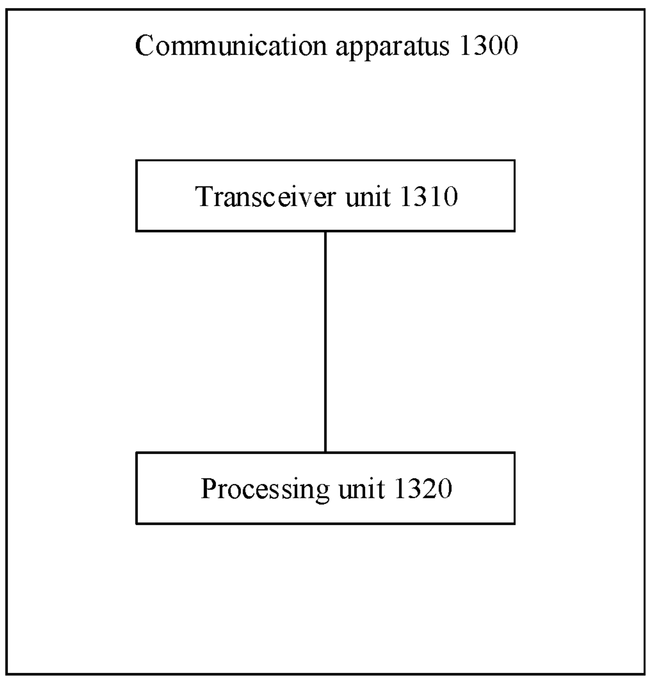
FIG. 13 is a schematic diagram of a structure of a communication apparatus according to an embodiment of this application.

When an integrated unit is used, FIG. 13 is a schematic diagram of a structure of a communication apparatus 1300 according to an embodiment of this application. The communication apparatus 1300 may be the terminal 100 in the foregoing embodiments. Optionally, the communication apparatus 1300 may be a chip/chip system, for example, a BeiDou communication chip. As shown in FIG. 13, the communication apparatus 1300 may include a transceiver unit 1310 and a processing unit 1320.

In a design, the transceiver unit 1310 may be configured to send a first user frame to the BeiDou network device 200.

The processing unit 1320 may be configured to: compress a user ID of the terminal 100, encode a compressed user ID into binary data, and then fill the binary data into a user ID field included in frame header information of the first user frame.

Optionally, the transceiver unit 1310 may be further configured to perform functional steps that are related to sending and receiving and that are performed by the terminal 100 in the method embodiment shown in FIG. 11A.

Optionally, the processing unit 1320 may be further configured to perform functional steps that are related to protocol parsing, encapsulation, and operation determining and that are performed by the terminal 100 in the method embodiment shown in FIG. 11A.

It should be understood that the communication apparatus 1300 in this design may correspondingly perform the method steps performed by the terminal 100 in the foregoing embodiments. For brevity, details are not described herein again.

Figure 14:
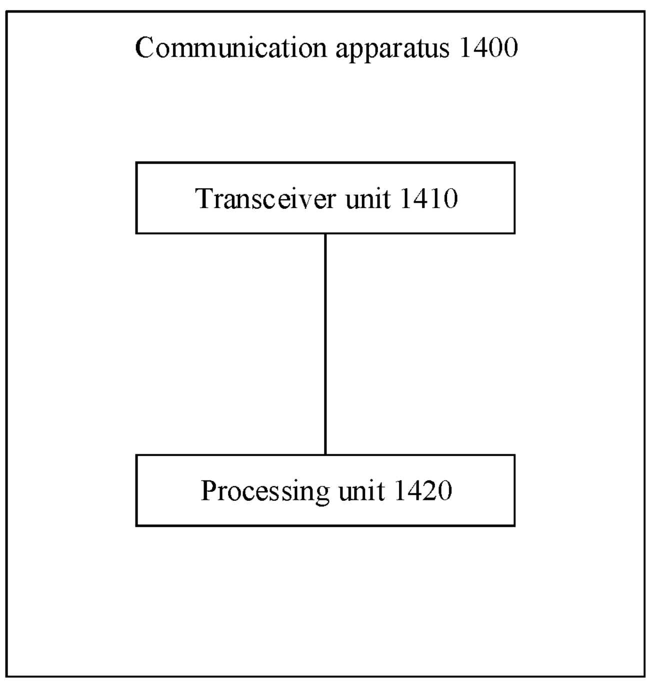
FIG. 14 is a schematic diagram of a structure of another communication apparatus according to an embodiment of this application.

When an integrated unit is used, FIG. 14 is a schematic diagram of a structure of a communication apparatus 1400 according to an embodiment of this application. The communication apparatus 1400 may be the BeiDou network device 200 in the foregoing embodiments. Optionally, the communication apparatus 1400 may be a specific network element in the BeiDou network device 200, for example, a network element or a combination of a plurality of network elements in the BeiDou ground transceiver station 22, the BeiDou central station 23, or the BeiDou short message converged communication platform 24. As shown in FIG. 14, the communication apparatus 1400 may include a transceiver unit 1410 and a processing unit 1420.

In a design, the transceiver unit 1410 may be configured to receive a user frame sent by the terminal 100.

The processing unit 1420 may be configured to: obtain a user ID of the terminal 100 from the user frame sent by the terminal 100, compress the user ID of the terminal 100, encode a compressed user ID into binary data, and finally fill the binary data into a user ID field included in frame header information of the user frame sent by the BeiDou network device 200 to the terminal 100.

Optionally, the transceiver unit 1410 may be further configured to perform functional steps that are related to sending and receiving and that are performed by the BeiDou network device 200 in the method embodiment shown in FIG. 11B.

Optionally, the processing unit 1420 may be further configured to perform functional steps that are related to protocol parsing, encapsulation, and operation determining and that are performed by the BeiDou network device 200 in the method embodiment shown in FIG. 11B.

It should be understood that the communication apparatus 1400 in this design may correspondingly perform the method steps performed by the BeiDou network device 200 in the foregoing embodiments. For brevity, details are not described herein again.

The foregoing describes the terminal 100 and the BeiDou network device 200 in embodiments of this application. It should be understood that a product in any form that has the functions of the terminal 100 in FIG. 12 and a product in any form that has the functions of the BeiDou network device 200 in FIG. 13 fall within the protection scope of embodiments of this application.

In a possible product form, the terminal 100 in embodiments of this application may be implemented by using a general bus architecture.

Figure 15:
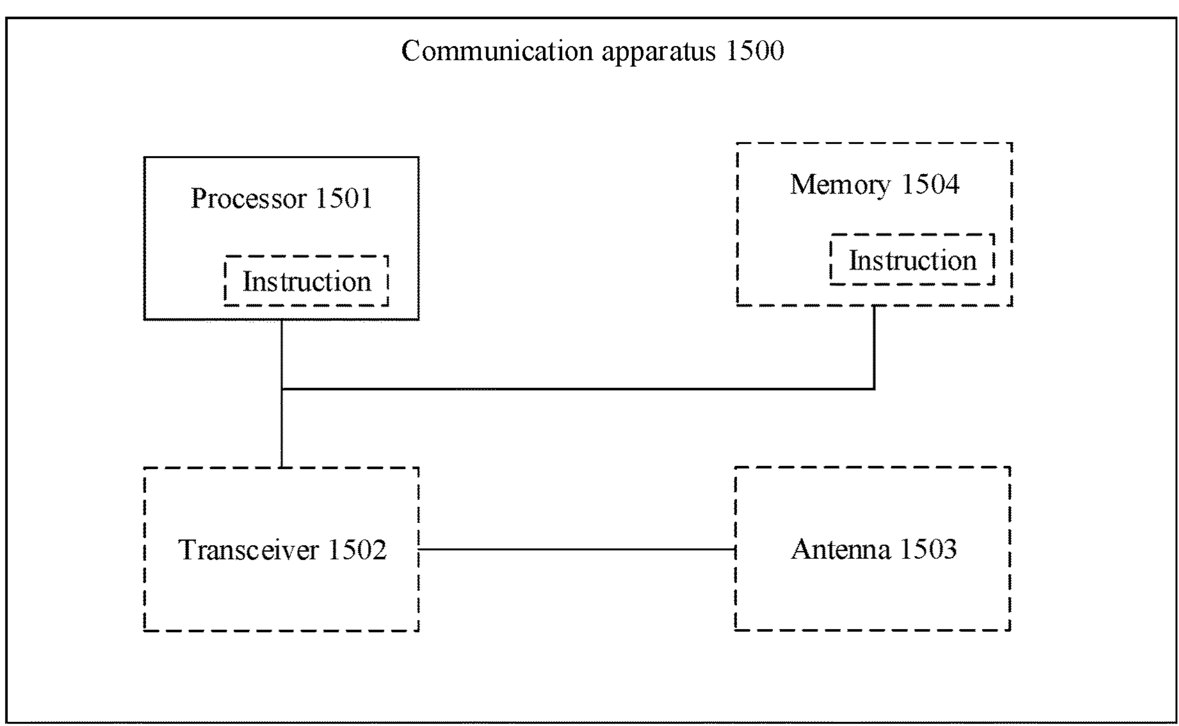
FIG. 15 is a schematic diagram of a structure of another communication apparatus according to an embodiment of this application.

FIG. 15 is a schematic diagram of a structure of a communication apparatus 1500 according to an embodiment of this application. The communication apparatus 1500 may be the terminal 100 or an apparatus in the terminal 100. As shown in FIG. 15, the communication apparatus 1500 includes a processor 1501 and a transceiver 1502 that is internally connected to and communicates with the processor. The processor 1501 is a general-purpose processor, a dedicated processor, or the like, for example, may be a satellite communication baseband processor or a central processing unit. The satellite communication baseband processor may be configured to process a satellite communication protocol and satellite communication data. The central processing unit may be configured to: control a communication apparatus (for example, a baseband chip, a terminal, or a terminal chip), execute a computer program, and process data of the computer program. The transceiver 1502 may be referred to as a transceiver unit, a transceiver, a transceiver circuit, or the like, and is configured to implement a transceiver function. The transceiver 1502 may include a receiver and a transmitter. The receiver may be referred to as a receiving device, a receiver circuit, or the like, and is configured to implement the receiving function. The transmitter may be referred to as a transmitting device, a transmitter circuit, or the like, and is configured to implement the sending function. Optionally, the communication apparatus 1500 may further include an antenna 1503 and/or a radio frequency unit (not shown in the figure). The antenna 1503 and/or the radio frequency unit may be located inside the communication apparatus 1500, or may be separated from the communication apparatus 1400. In other words, the antenna 1503 and/or the radio frequency unit may be deployed remotely or in a distributed manner.

Optionally, the communication apparatus 1500 may include one or more memories 1504. The memory 1504 may store instructions. The instructions may be a computer program. The computer program may be run on the communication apparatus 1500, to enable the communication apparatus 1500 to perform the methods described in the foregoing method embodiments. Optionally, the memory 1504 may further store data. The communication apparatus 1500 and the memory 1504 may be separately disposed, or may be integrated.

The processor 1501, the transceiver 1502, and the memory 1504 may be connected through a communication bus.

In a design, the communication apparatus 1500 may be configured to perform functions of the terminal 100 in the foregoing embodiments. The processor 1501 may be configured to perform functional steps that are related to protocol parsing, encapsulation, and operation determining and that are performed by the terminal 100 in the embodiment shown in FIG. 11A, and/or another process of the technology described herein. The transceiver 1502 may be configured to perform functional steps that are related to protocol parsing, encapsulation, and operation determining and that are performed by the terminal 100 in the embodiment shown in FIG. 11A, and/or another process of the technology described herein.

In any one of the foregoing designs, the processor 1501 may include a transceiver configured to implement a sending function and a receiving function. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1501 may store instructions. The instruction may be a computer program. The computer program is run on the processor 1501, to enable the communication apparatus 1500 to perform the method steps performed by the terminal 100 in the foregoing method embodiments. The computer program may be fixed in the processor 1501. In this case, the processor 1501 may be implemented by hardware.

In an implementation, the communication apparatus 1500 may include a circuit. The circuit may implement the sending, receiving, or communication function in the foregoing method embodiments. The processor and the transceiver that are described in this application may be implemented on an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and the structure of the communication apparatus may not be limited in FIG. 15. The communication apparatus 1500 may be an independent device or may be a part of a large device. For example, the communication apparatus 1500 may be:

(1) an independent integrated circuit IC, a chip, or a chip system or subsystem;
(2) a set including one or more ICs, where optionally, the set of ICs may further include a storage component configured to store data and a computer program;
(3) an ASIC, for example, a modem (Modem);
(4) a module that can be embedded in another device;
(5) a receiving device, a terminal, an intelligent terminal, a cellular phone, a wireless device, a handheld device, a mobile unit, a vehicle-mounted device, a network device, a cloud device, an artificial intelligence device, or the like; or
(6) others.

In a possible product form, any network element (for example, the BeiDou ground transceiver station 22, the BeiDou central station 23, or the BeiDou short message converged communication platform 24) in the BeiDou network device 200 in this embodiment of this application may be implemented by using a general bus architecture.

Figure 16:
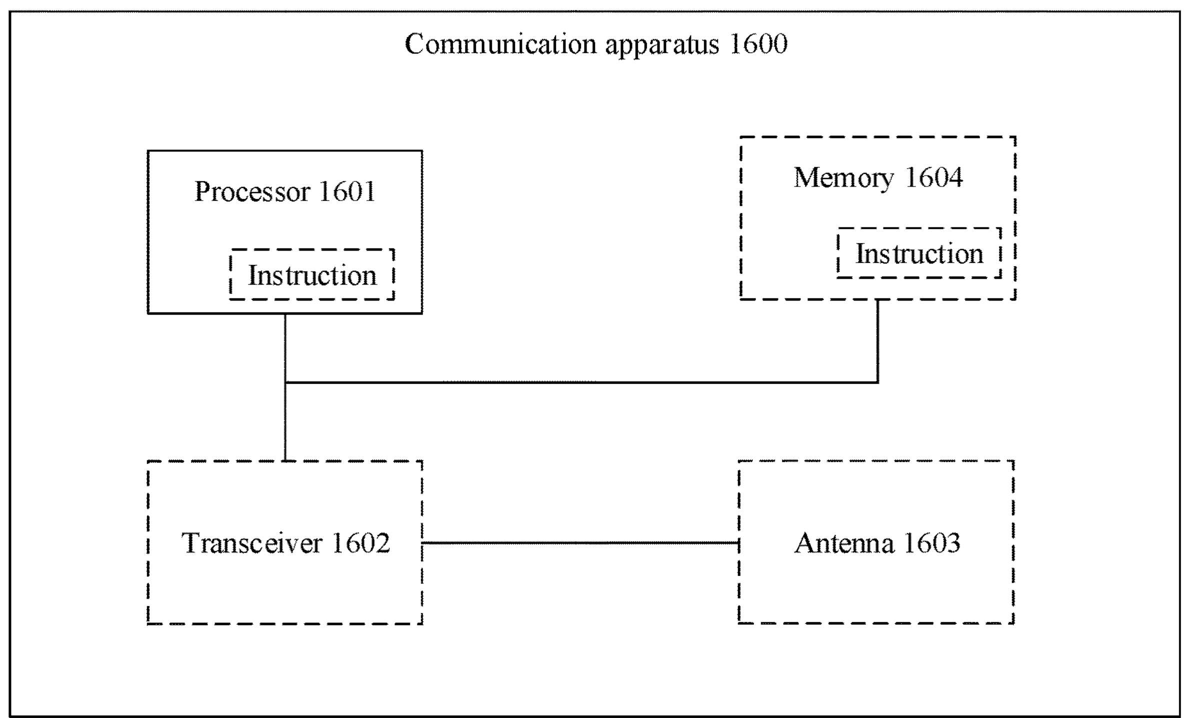
FIG. 16 is a schematic diagram of a structure of another communication apparatus according to an embodiment of this application.

FIG. 16 is a schematic diagram of a structure of a communication apparatus 1600 according to an embodiment of this application. The communication apparatus 1600 may be the BeiDou network device 200 or an apparatus in the BeiDou network device 200. As shown in FIG. 16, the communication apparatus 1600 includes a processor 1601 and a transceiver 1602 that is internally connected to and communicates with the processor. The processor 1601 is a general-purpose processor, a dedicated processor, or the like, for example, may be a satellite communication baseband processor or a central processing unit. The satellite communication baseband processor may be configured to process a satellite communication protocol and satellite communication data. The central processing unit may be configured to: control a communication apparatus (for example, a baseband chip), execute a computer program, and process data of the computer program. The transceiver 1602 may be referred to as a transceiver unit, a transceiver, a transceiver circuit, or the like, and is configured to implement a transceiver function. The transceiver 1602 may include a receiver and a transmitter. The receiver may be referred to as a receiving device, a receiver circuit, or the like, and is configured to implement the receiving function. The transmitter may be referred to as a transmitting device, a transmitter circuit, or the like, and is configured to implement the sending function. Optionally, the communication apparatus 1600 may further include an antenna 1603 and/or a radio frequency unit (not shown in the figure). The antenna 1603 and/or the radio frequency unit may be located inside the communication apparatus 1600, or may be separated from the communication apparatus 1600. In other words, the antenna 1603 and/or the radio frequency unit may be deployed remotely or in a distributed manner.

Optionally, the communication apparatus 1600 may include one or more memories 1604. The memory 1604 may store instructions. The instructions may be a computer program. The computer program may be run on the communication apparatus 1600, to enable the communication apparatus 1600 to perform the method described in the foregoing method embodiments. Optionally, the memory 1604 may further store data. The communication apparatus 1600 and the memory 1604 may be separately disposed, or may be integrated.

The processor 1601, the transceiver 1602, and the memory 1604 may be connected through a communication bus.

In a design, the communication apparatus 1600 may be configured to perform functions of the BeiDou network device 200 in the foregoing embodiments. The processor 1601 may be configured to perform functional steps that are related to protocol parsing, encapsulation, and operation determining and that are performed by the BeiDou network device 200 in the embodiment shown in FIG. 11B, and/or another process of the technology described herein. The transceiver 1602 may be configured to perform functional steps that are related to protocol parsing, encapsulation, and operation determining and that are performed by the BeiDou network device 200 in the embodiment shown in FIG. 11B, and/or another process of the technology described herein.

In any one of the foregoing designs, the processor 1601 may include a transceiver configured to implement a sending function and a receiving function. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1601 may store instructions. The instruction may be a computer program. The computer program is run on the processor 1601, to enable the communication apparatus 1600 to perform the method steps performed by the terminal 100 in the foregoing method embodiments. The computer program may be fixed in the processor 1601. In this case, the processor 1601 may be implemented by hardware.

An embodiment of this application further provides a computer-readable storage medium. The computer-readable storage medium stores computer program code. When the processor executes the computer program code, the communication apparatus performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a BeiDou communication system, including the terminal 100 and the BeiDou network device 200. The terminal 100 and the BeiDou network device 200 may perform the method in any one of the foregoing embodiments.

A short message communication function in the BeiDou communication system is described in this application. It may be understood that another satellite system may also support the short message communication function. Therefore, in the BeiDou communication system, if another satellite system also supports the short message communication function, the method described in this application is also applicable to communication of the another satellite system.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A data compression method in a satellite communication system, comprising:

encoding, by a first terminal at a satellite link control (SLC) layer, a first user identification (ID) of the first terminal into binary first data, wherein the first user ID comprises second data and third data, the binary first data comprises binary fourth data and binary fifth data, the binary fourth data is obtained by encoding sixth data, the sixth data is obtained by compressing the second data, a data length of the sixth data is less than that of the second data, and the binary fifth data is obtained by encoding the third data;

filling, by the first terminal at the SLC layer, the binary first data in a user ID field in frame header information of a first user frame; and sending, by the first terminal, the first user frame to a satellite network device.

2. The method according to claim 1, wherein encoding, by the first terminal at the SLC layer, the first user ID of the first terminal into the binary first data comprises:

compressing, by the first terminal at the SLC layer, the second data in the first user ID of the first terminal into the sixth data, wherein the first user ID comprises the second data and the third data, and the data length of the sixth data is less than that of the second data;

encoding, by the first terminal at the SLC layer, the sixth data into the binary fourth data, and encoding the third data into the binary fifth data; and combining, by the first terminal, the binary fourth data and the binary fifth data into the binary first data.

3. The method according to claim 2, wherein compressing, by the first terminal at the SLC layer, the second data in the first user ID of the first terminal into the sixth data comprises:

mapping, by the first terminal at the SLC layer, the second data in the first user ID to the sixth data in a mapping table, wherein the mapping table comprises the second data of a plurality of values and the sixth data of a plurality of values, the second data of the plurality of values comprises second data of a first value, the sixth data of the plurality of values comprises sixth data of a second value, and the second data of the first value is mapped to the sixth data of the second value.

4. The method according to claim 2, wherein compressing, by the first terminal at the SLC layer, the second data in the first user ID of the first terminal into the sixth data comprises:

subtracting, by the first terminal at the SLC layer, a preset offset value from the second data in the first user ID, to obtain the sixth data.

5. The method according to claim 2, wherein encoding, by the first terminal at the SLC layer, the sixth data into the binary fourth data, and encoding the third data into the binary fifth data comprises:

converting, by the first terminal at the SLC layer, the sixth data as a decimal integer into the binary fourth data, and converting the third data as a decimal integer into the binary fifth data.

6. The method according to claim 1, wherein the first user ID is a mobile number, the second data is a national destination code (NDC) in the mobile number, and the third data is a subscriber number (SN) in the mobile number.

7. The method according to claim 1, further comprising, before encoding, by the first terminal at the SLC layer, the first user ID of the first terminal into the binary first data:

detecting, by the first terminal, a first operation, wherein the first operation indicates the first terminal to send a first message to a second terminal;

compressing, by the first terminal at an application (APP) layer, a second user ID of the second terminal, and then encoding a compressed second user ID into seventh data; and generating, by the first terminal at the APP layer, a first message packet, wherein the first message packet comprises a packet header and packet data, the packet header comprises the seventh data, and the packet data comprises content of the first message.

8. The method according to claim 7, further comprising, after generating, by the first terminal at the APP layer, the first message packet:

delivering, by the first terminal, the first message packet to the SLC layer, to obtain one or more satellite link control layer service data units (SLC SDUs), wherein the one or more SLC SDUs comprise a first SLC SDU; and segmenting, by the first terminal, the first SLC SDU into one or more user frames, wherein the one or more user frames comprise the first user frame.

9. The method according to claim 1, further comprising:

receiving, by the first terminal, a second user frame sent by the satellite network device, wherein the second user frame is sent by a second terminal to the first terminal;

decoding and decompressing, by the first terminal at the SLC layer, a user ID field in frame header information of the second user frame, to obtain user ID data;

in response to the first terminal determining that the user ID data is the same as the first user ID, uploading, by the first terminal, the second user frame to a message data convergence protocol (MDCP) layer; and in response to the first terminal determining that the user ID data is different from the first user ID, discarding, by the first terminal, the second user frame.

10. The method according to claim 9, further comprising after decoding and decompressing, by the first terminal at the SLC layer, the user ID field in the frame header information of the second user frame, to obtain the first user ID of the first terminal:

uploading, by the first terminal, user data in the second user frame to an application (APP) layer, to obtain a second message packet;

decoding and decompressing, by the first terminal at the APP layer, a user ID field in a header of the second message packet, to obtain a second user ID of the second terminal; and determining, by the first terminal based on the second user ID, that the second message packet is sent by the second terminal.

11. A first terminal, comprising:

a transceiver;

one or more processors coupled to the transceiver;

one or more memories coupled to the one or more processors with instructions stored thereon, wherein, when the one or more processors execute the instructions, the first terminal is enabled to perform the following steps:

encoding at a satellite link control (SLC) layer, a first user identification (ID) of the first terminal into binary first data, wherein the first user ID comprises second data and third data, the binary first data comprises binary fourth data and binary fifth data, the binary fourth data is obtained by encoding sixth data, the sixth data is obtained by compressing the second data, a data length of the sixth data is less than that of the second data, and the binary fifth data is obtained by encoding the third data;

filling at the SLC layer, the binary first data in a user ID field in frame header information of a first user frame; and sending the first user frame to a satellite network device.

12. The first terminal according to claim 11, wherein encoding at the SLC layer, the first user ID of the first terminal into the binary first data comprises:

compressing at the SLC layer, the second data in the first user ID of the first terminal into the sixth data, wherein the first user ID comprises the second data and the third data, and the data length of the sixth data is less than that of the second data;

encoding at the SLC layer, the sixth data into the binary fourth data, and encoding the third data into the binary fifth data; and combining the binary fourth data and the binary fifth data into the binary first data.

13. The first terminal according to claim 12, wherein compressing at the SLC layer, the second data in the first user ID of the first terminal into the sixth data comprises:

mapping at the SLC layer, the second data in the first user ID to the sixth data in a mapping table, wherein the mapping table comprises the second data of a plurality of values and the sixth data of a plurality of values, the second data of the plurality of values comprises second data of a first value, the sixth data of the plurality of values comprises sixth data of a second value, and the second data of the first value is mapped to the sixth data of the second value.

14. The first terminal according to claim 12, wherein the compressing at the SLC layer, the second data in the first user ID of the first terminal into the sixth data comprises:

subtracting at the SLC layer, a preset offset value from the second data in the first user ID, to obtain the sixth data.

15. The first terminal according to claim 12, wherein encoding at the SLC layer, the sixth data into the binary fourth data, and encoding the third data into the binary fifth data comprises:

converting at the SLC layer, the sixth data as a decimal integer into the binary fourth data, and converting the third data as a decimal integer into the binary fifth data.

16. The first terminal according to claim 11, wherein the first user ID is a mobile number, the second data is a national destination code (NDC) in the mobile number, and the third data is a subscriber number (SN) in the mobile number.

17. The first terminal according to claim 11, wherein the instructions, when executed by the one or more processors, enable the first terminal to perform the following steps:

before encoding at the SLC layer, the first user ID of the first terminal into the binary first data:

detecting a first operation, wherein the first operation indicates the first terminal to send a first message to a second terminal, compressing at an application (APP) layer, a second user ID of the second terminal, and then encoding a compressed second user ID into seventh data, and generating at the APP layer, a first message packet, wherein the first message packet comprises a packet header and packet data, the packet header comprises the seventh data, and the packet data comprises content of the first message.

18. The first terminal according to claim 17, wherein the instructions, when executed by the one or more processors, enable the first terminal to perform the following steps:

after generating at the APP layer, the first message packet:

delivering the first message packet to the SLC layer, to obtain one or more satellite link control layer service data units (SLC SDUs), wherein the one or more SLC SDUs comprise a first SLC SDU, and segmenting the first SLC SDU into one or more user frames, wherein the one or more user frames comprise the first user frame.

19. The first terminal according to claim 11, wherein the instructions, when executed by the one or more processors, enable the first terminal to perform the following steps:

receiving a second user frame sent by the satellite network device, wherein the second user frame is sent by a second terminal to the first terminal;

decoding and decompressing, at the SLC layer, a user ID field in frame header information of the second user frame, to obtain user ID data;

in response to the first terminal determining that the user ID data is the same as the first user ID, uploading the second user frame to a message data convergence protocol (MDCP) layer; and in response to the first terminal determining that the user ID data is different from the first user ID, discarding the second user frame.

20. The first terminal according to claim 19, wherein the instructions, when executed by the one or more processors, enable the first terminal to perform the following steps:

after decoding and decompressing at the SLC layer, the user ID field in the frame header information of the second user frame, to obtain the first user ID of the first terminal:

uploading user data in the second user frame to an application (APP) layer, to obtain a second message packet;

decoding and decompressing at the APP layer, a user ID field in a header of the second message packet, to obtain a second user ID of the second terminal; and determining based on the second user ID, that the second message packet is sent by the second terminal.

* * * * *